US009179367B2

(12) United States Patent
Krishnaswamy et al.

(10) Patent No.: US 9,179,367 B2
(45) Date of Patent: Nov. 3, 2015

(54) MAXIMIZING SERVICE PROVIDER UTILITY IN A HETEROGENEOUS WIRELESS AD-HOC NETWORK

(75) Inventors: Dilip Krishnaswamy, San Diego, CA (US); Atul Suri, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 170 days.

(21) Appl. No.: 12/787,301

(22) Filed: May 25, 2010

(65) Prior Publication Data
US 2011/0019627 A1 Jan. 27, 2011

Related U.S. Application Data

(60) Provisional application No. 61/181,224, filed on May 26, 2009.

(51) Int. Cl.
*H04W 84/20* (2009.01)
*H04W 28/20* (2009.01)
(Continued)

(52) U.S. Cl.
CPC .............. *H04W 28/20* (2013.01); *H04L 12/14* (2013.01); *H04L 12/145* (2013.01); *H04L 12/1485* (2013.01); *H04L 12/1489* (2013.01); *H04L 41/0896* (2013.01); *H04L 41/5003* (2013.01); *H04M 15/00* (2013.01); *H04M 15/55* (2013.01); *H04M 15/58* (2013.01); *H04M 15/80* (2013.01); *H04M 15/8027* (2013.01); *H04W 4/24* (2013.01); *H04L 41/22* (2013.01);
(Continued)

(58) Field of Classification Search
CPC ....... H04W 4/24; H04W 84/22; H04W 88/04; H04L 41/0896

USPC ................ 370/230, 231, 235, 329, 331, 468; 455/522
See application file for complete search history.

(56) References Cited

U.S. PATENT DOCUMENTS 5,263,121 A * 11/1993 Melsa et al. ................... 706/19
5,301,359 A    4/1994 Van Den Heuvel et al.
(Continued)

FOREIGN PATENT DOCUMENTS

CN    1342377 A    3/2002
CN    1360795 A    7/2002
(Continued)

OTHER PUBLICATIONS

Ashutosh, et al., "Seamless proactive handover across heterogeneous access networks" Wirless Personal Communciations, Kluwer Academic Publishers, DO, vol. 43, No. 3, Jun. 28, 2007, pp. 837-855, XP019557974.
(Continued)

*Primary Examiner* — Xavier Szewai Wong
(74) *Attorney, Agent, or Firm* — Howard Seo

(57) ABSTRACT

An ad-hoc service provider is configured to support a wireless connection to the network. The ad-hoc service provider is further configured to provide access to the network for one or more mobile clients. The one or more mobile clients are configured to select the ad-hoc service provider based on at least one parameter related to the ad-hoc service provider's ability to support the wireless connection. The ad-hoc service provider is further configured to allocate bandwidth to the one or more mobile clients based on at least one parameter related to the effect on the ad-hoc service provider for providing such bandwidth.

51 Claims, 9 Drawing Sheets

(51) Int. Cl.
*H04L 12/14* (2006.01)
*H04L 12/24* (2006.01)
*H04M 15/00* (2006.01)
*H04W 4/24* (2009.01)
*H04W 88/00* (2009.01)
*H04W 4/20* (2009.01)
*H04W 84/22* (2009.01)
*H04W 88/04* (2009.01)

(52) U.S. Cl.
CPC ........... *H04M2215/0188* (2013.01); *H04M 2215/2046* (2013.01); *H04M 2215/74* (2013.01); *H04M 2215/7428* (2013.01); *H04W 84/22* (2013.01); *H04W 88/04* (2013.01)

(56) References Cited

U.S. PATENT DOCUMENTS

| | | | |
|---|---|---|---|
| 5,999,813 | A | 12/1999 | Lu et al. |
| 6,125,185 | A | 9/2000 | Boesch |
| 6,275,712 | B1 | 8/2001 | Gray et al. |
| 6,295,453 | B1 | 9/2001 | Desgagne et al. |
| 6,377,805 | B1 | 4/2002 | Anvekar et al. |
| 6,650,900 | B1 | 11/2003 | Chavez, Jr. et al. |
| 6,735,417 | B2 | 5/2004 | Fonseca, Jr. et al. |
| 6,788,656 | B1 | 9/2004 | Smolentzov et al. |
| 6,871,071 | B2 | 3/2005 | Takao et al. |
| 6,879,574 | B2 | 4/2005 | Naghian et al. |
| 6,961,575 | B2 | 11/2005 | Stanforth |
| 6,970,422 | B1 | 11/2005 | Ho et al. |
| 7,003,117 | B2 | 2/2006 | Kacker et al. |
| 7,046,647 | B2 | 5/2006 | Oba et al. |
| 7,089,417 | B2 | 8/2006 | Wack et al. |
| 7,110,372 | B2 | 9/2006 | Kovacs et al. |
| 7,123,908 | B2 | 10/2006 | Chandler |
| 7,155,518 | B2 | 12/2006 | Forslow |
| 7,161,914 | B2 | 1/2007 | Shoaib et al. |
| 7,170,878 | B2 | 1/2007 | Fukuda |
| 7,254,119 | B2 | 8/2007 | Jiang et al. |
| 7,266,374 | B2 | 9/2007 | Kim |
| 7,266,383 | B2 | 9/2007 | Anderson |
| 7,295,532 | B2 | 11/2007 | Haller et al. |
| 7,313,363 | B2 | 12/2007 | Davis et al. |
| 7,339,915 | B2 | 3/2008 | Jakkahalli et al. |
| 7,340,253 | B2 | 3/2008 | LaPorta et al. |
| 7,346,167 | B2 | 3/2008 | Billhartz et al. |
| 7,349,370 | B2 | 3/2008 | Lee et al. |
| 7,362,731 | B2 | 4/2008 | Vinayakray-Jani |
| 7,363,050 | B2 | 4/2008 | Nakano |
| 7,394,826 | B2 | 7/2008 | Cain et al. |
| 7,406,313 | B2 | 7/2008 | Lynch, Jr. et al. |
| 7,408,929 | B2 | 8/2008 | Adachi et al. |
| 7,420,952 | B2 | 9/2008 | Da Costa et al. |
| 7,444,152 | B2 | 10/2008 | Wu et al. |
| 7,486,651 | B2 | 2/2009 | Hagiwara et al. |
| 7,496,363 | B2 | 2/2009 | Salkintzis |
| 7,519,071 | B2 | 4/2009 | Thubert et al. |
| 7,551,576 | B2 | 6/2009 | Ahmavaara |
| 7,552,234 | B2 | 6/2009 | Thubert et al. |
| 7,573,904 | B2 | 8/2009 | Pichna et al. |
| 7,577,108 | B2 | 8/2009 | Zhang et al. |
| 7,593,378 | B1 | 9/2009 | Murali et al. |
| 7,624,267 | B2 | 11/2009 | Huang et al. |
| 7,649,872 | B2 | 1/2010 | Naghian et al. |
| 7,664,049 | B1 | 2/2010 | Arrakoski et al. |
| 7,680,079 | B2 | 3/2010 | Jeong et al. |
| 7,757,076 | B2 | 7/2010 | Stewart et al. |
| 7,881,474 | B2 | 2/2011 | Sun |
| 7,903,817 | B2 | 3/2011 | Cam-Winget et al. |
| 7,929,460 | B2 | 4/2011 | Chen et al. |
| 7,933,247 | B2 | 4/2011 | Gidwani |
| 8,014,368 | B2 | 9/2011 | Kim et al. |
| 8,295,225 | B2 | 10/2012 | Ji et al. |
| 8,717,931 | B2 | 5/2014 | Taniuchi et al. |
| 2001/0012757 | A1 | 8/2001 | Boyle |
| 2001/0024443 | A1 | 9/2001 | Alriksson et al. |
| 2002/0039367 | A1 | 4/2002 | Seppala et al. |
| 2002/0061750 | A1 | 5/2002 | Mohebbi |
| 2002/0080738 | A1 | 6/2002 | Kim et al. |
| 2002/0138635 | A1 | 9/2002 | Redlich et al. |
| 2002/0181447 | A1 | 12/2002 | Hashizume et al. |
| 2002/0198019 | A1 | 12/2002 | Naim et al. |
| 2003/0054796 | A1 | 3/2003 | Tamaki et al. |
| 2003/0087646 | A1 | 5/2003 | Funato et al. |
| 2003/0092444 | A1 | 5/2003 | Sengodan et al. |
| 2003/0095504 | A1 | 5/2003 | Ogier |
| 2003/0101263 | A1* | 5/2003 | Bouillet et al. ............... 709/225 |
| 2003/0103496 | A1 | 6/2003 | Lakshmi et al. |
| 2003/0103521 | A1 | 6/2003 | Raphaeli et al. |
| 2003/0123404 | A1 | 7/2003 | Kasapi et al. |
| 2003/0157951 | A1 | 8/2003 | Hasty, Jr. |
| 2003/0169697 | A1 | 9/2003 | Suzuki et al. |
| 2003/0198346 | A1 | 10/2003 | Meifu et al. |
| 2003/0202476 | A1 | 10/2003 | Billhartz et al. |
| 2003/0203741 | A1 | 10/2003 | Matsuo et al. |
| 2003/0212802 | A1 | 11/2003 | Rector et al. |
| 2003/0235174 | A1 | 12/2003 | Pichna et al. |
| 2004/0001442 | A1 | 1/2004 | Rayment et al. |
| 2004/0008663 | A1 | 1/2004 | Srikrishna et al. |
| 2004/0068668 | A1 | 4/2004 | Lor et al. |
| 2004/0087268 | A1 | 5/2004 | Hatano |
| 2004/0171386 | A1 | 9/2004 | Mitjana |
| 2004/0174822 | A1 | 9/2004 | Bui |
| 2004/0202120 | A1 | 10/2004 | Hanson |
| 2004/0203787 | A1 | 10/2004 | Naghian |
| 2004/0235452 | A1 | 11/2004 | Fischer et al. |
| 2004/0235481 | A1 | 11/2004 | Shimizu |
| 2005/0053005 | A1 | 3/2005 | Cain et al. |
| 2005/0058109 | A1 | 3/2005 | Ekberg |
| 2005/0088980 | A1 | 4/2005 | Olkkonen et al. |
| 2005/0094588 | A1 | 5/2005 | Wentink |
| 2005/0108527 | A1 | 5/2005 | Ginzburg et al. |
| 2005/0136834 | A1 | 6/2005 | Bonta et al. |
| 2005/0138671 | A1 | 6/2005 | Love et al. |
| 2005/0197098 | A1 | 9/2005 | Trossen |
| 2005/0228853 | A1 | 10/2005 | Yamamura et al. |
| 2005/0243719 | A1 | 11/2005 | Haverinen et al. |
| 2005/0254472 | A1 | 11/2005 | Roh et al. |
| 2005/0286476 | A1 | 12/2005 | Crosswy et al. |
| 2006/0005008 | A1 | 1/2006 | Kao |
| 2006/0007863 | A1 | 1/2006 | Naghian |
| 2006/0009248 | A1 | 1/2006 | Sakamoto et al. |
| 2006/0056368 | A1 | 3/2006 | Ratiu et al. |
| 2006/0064589 | A1 | 3/2006 | Taniguchi et al. |
| 2006/0092939 | A1 | 5/2006 | Duggi et al. |
| 2006/0098598 | A1 | 5/2006 | Gallagher |
| 2006/0101400 | A1 | 5/2006 | Capek et al. |
| 2006/0114523 | A1* | 6/2006 | McAuley et al. ............. 370/229 |
| 2006/0114850 | A1 | 6/2006 | Avinash |
| 2006/0143026 | A1* | 6/2006 | Jagannathan et al. ............ 705/1 |
| 2006/0176852 | A1 | 8/2006 | Wu et al. |
| 2006/0178149 | A1 | 8/2006 | Kamat et al. |
| 2006/0215576 | A1 | 9/2006 | Yu et al. |
| 2006/0217062 | A1 | 9/2006 | Saffre et al. |
| 2006/0227724 | A1 | 10/2006 | Thubert et al. |
| 2006/0229080 | A1 | 10/2006 | Khan et al. |
| 2006/0236105 | A1 | 10/2006 | Brok et al. |
| 2006/0240828 | A1 | 10/2006 | Jain et al. |
| 2006/0258391 | A1 | 11/2006 | Lee |
| 2006/0268767 | A1 | 11/2006 | Sato et al. |
| 2007/0008902 | A1 | 1/2007 | Yaramada et al. |
| 2007/0016262 | A1 | 1/2007 | Gross et al. |
| 2007/0038743 | A1 | 2/2007 | Hellhake et al. |
| 2007/0042769 | A1 | 2/2007 | Thommana et al. |
| 2007/0076875 | A1 | 4/2007 | Kaechi |
| 2007/0097906 | A1 | 5/2007 | Kato |
| 2007/0110009 | A1 | 5/2007 | Bachmann et al. |
| 2007/0111705 | A1 | 5/2007 | Zhang et al. |
| 2007/0149139 | A1 | 6/2007 | Gauvreau |
| 2007/0172040 | A1* | 7/2007 | Cesarini et al. ............... 379/126 |
| 2007/0198656 | A1 | 8/2007 | Mazzaferri |
| 2007/0206527 | A1 | 9/2007 | Lo et al. |
| 2007/0217433 | A1* | 9/2007 | Doppler et al. |
| 2007/0220219 | A1 | 9/2007 | Bansal et al. |

(56) References Cited

U.S. PATENT DOCUMENTS

| | | | |
|---|---|---|---|
| 2007/0223408 A1 | 9/2007 | Thielke et al. | |
| 2007/0234061 A1 | 10/2007 | Teo | |
| 2007/0253376 A1 | 11/2007 | Bonta et al. | |
| 2007/0254614 A1 | 11/2007 | Muralidharan et al. | |
| 2007/0291722 A1* | 12/2007 | Lee | 370/338 |
| 2008/0040481 A1 | 2/2008 | Joshi et al. | |
| 2008/0046542 A1 | 2/2008 | Sano | |
| 2008/0049689 A1 | 2/2008 | Nakfour et al. | |
| 2008/0069105 A1 | 3/2008 | Costa et al. | |
| 2008/0080387 A1 | 4/2008 | Wang et al. | |
| 2008/0081606 A1 | 4/2008 | Cole | |
| 2008/0081623 A1 | 4/2008 | Burgan et al. | |
| 2008/0089288 A1 | 4/2008 | Anschutz et al. | |
| 2008/0095114 A1 | 4/2008 | Dutta et al. | |
| 2008/0095134 A1 | 4/2008 | Chen et al. | |
| 2008/0112355 A1 | 5/2008 | Krishnakumar et al. | |
| 2008/0112362 A1 | 5/2008 | Korus | |
| 2008/0139239 A1 | 6/2008 | O'Connor | |
| 2008/0146232 A1 | 6/2008 | Knisely | |
| 2008/0165735 A1 | 7/2008 | Chen et al. | |
| 2008/0165786 A1 | 7/2008 | Ahuja et al. | |
| 2008/0192666 A1 | 8/2008 | Koskan et al. | |
| 2008/0254800 A1 | 10/2008 | Chun et al. | |
| 2008/0298284 A1 | 12/2008 | Dawson et al. | |
| 2009/0046591 A1 | 2/2009 | Krishnaswamy et al. | |
| 2009/0046598 A1 | 2/2009 | Krishnaswamy et al. | |
| 2009/0046644 A1 | 2/2009 | Krishnaswamy et al. | |
| 2009/0046658 A1 | 2/2009 | Krishnaswamy | |
| 2009/0046676 A1 | 2/2009 | Krishnaswamy et al. | |
| 2009/0046861 A1 | 2/2009 | Krishnaswamy | |
| 2009/0047930 A1 | 2/2009 | Krishnaswamy et al. | |
| 2009/0047964 A1 | 2/2009 | Krishnaswamy | |
| 2009/0047966 A1 | 2/2009 | Krishnaswamy et al. | |
| 2009/0049158 A1 | 2/2009 | Krishnaswamy et al. | |
| 2009/0073943 A1 | 3/2009 | Krishnaswamy et al. | |
| 2009/0125429 A1 | 5/2009 | Takayama | |
| 2009/0172391 A1 | 7/2009 | Kasapidis | |
| 2010/0034131 A1 | 2/2010 | Kasapi et al. | |
| 2010/0173631 A1* | 7/2010 | Kim et al. | 455/436 |
| 2010/0202428 A1 | 8/2010 | Thompson et al. | |
| 2011/0026477 A1* | 2/2011 | Sinivaara et al. | 370/329 |
| 2011/0039566 A1* | 2/2011 | Zee et al. | 455/450 |
| 2011/0183685 A1 | 7/2011 | Burton et al. | |
| 2012/0027001 A1 | 2/2012 | Krishnaswamy et al. | |
| 2014/0241296 A1* | 8/2014 | Shattil | 370/329 |

FOREIGN PATENT DOCUMENTS

| | | |
|---|---|---|
| CN | 1435027 A | 8/2003 |
| CN | 1602109 A | 3/2005 |
| CN | 1736041 A | 2/2006 |
| CN | 1741485 A | 3/2006 |
| CN | 1747449 A | 3/2006 |
| CN | 1921418 A | 2/2007 |
| CN | 1929384 A | 3/2007 |
| CN | 1961531 A | 5/2007 |
| DE | 10208689 | 9/2003 |
| DE | 102005021315 | 12/2005 |
| EP | 1289200 A1 | 3/2003 |
| EP | 1445893 A2 | 8/2004 |
| EP | 1458151 A1 | 9/2004 |
| EP | 1178644 B1 | 7/2006 |
| EP | 1677462 A1 | 7/2006 |
| EP | 1701486 A1 | 9/2006 |
| EP | 1761082 A1 | 3/2007 |
| EP | 1775972 A1 | 4/2007 |
| GB | 2388276 | 11/2003 |
| GB | 2398462 | 8/2004 |
| GB | 2408173 | 5/2005 |
| JP | 2000115171 A | 4/2000 |
| JP | 2001275145 A | 10/2001 |
| JP | 2002510447 A | 4/2002 |
| JP | 2002544727 A | 12/2002 |
| JP | 2003070068 A | 3/2003 |
| JP | 2003101553 A | 4/2003 |
| JP | 2003143644 A | 5/2003 |
| JP | 2003230167 A | 8/2003 |
| JP | 2004153529 A | 5/2004 |
| JP | 2004519911 A | 7/2004 |
| JP | 2004253885 A | 9/2004 |
| JP | 2004264976 A | 9/2004 |
| JP | 2004320775 A | 11/2004 |
| JP | 2005500766 A | 1/2005 |
| JP | 2005502273 A | 1/2005 |
| JP | 2005033808 A | 2/2005 |
| JP | 2005117656 A | 4/2005 |
| JP | 2005123781 A | 5/2005 |
| JP | 2005176021 A | 6/2005 |
| JP | 2005204213 A | 7/2005 |
| JP | 2005523666 A | 8/2005 |
| JP | 2005295310 A | 10/2005 |
| JP | 2005531958 A | 10/2005 |
| JP | 2005536131 A | 11/2005 |
| JP | 2005341290 A | 12/2005 |
| JP | 2005348397 A | 12/2005 |
| JP | 2005536913 A | 12/2005 |
| JP | 2006013811 A | 1/2006 |
| JP | 2006502670 A | 1/2006 |
| JP | 2006041633 A | 2/2006 |
| JP | 2006050224 A | 2/2006 |
| JP | 2006505987 A | 2/2006 |
| JP | 2006074621 A | 3/2006 |
| JP | 2006163793 A | 6/2006 |
| JP | 2006197462 A | 7/2006 |
| JP | 2006287426 A | 10/2006 |
| JP | 2006304005 A | 11/2006 |
| JP | 2007036828 A | 2/2007 |
| JP | 2007037111 A | 2/2007 |
| JP | 2007074382 A | 3/2007 |
| JP | 2007505553 A | 3/2007 |
| JP | 2007508781 A | 4/2007 |
| JP | 2007116710 A | 5/2007 |
| JP | 2007129380 A | 5/2007 |
| JP | 2007143066 A | 6/2007 |
| JP | 2007522725 A | 8/2007 |
| JP | 2007528162 A | 10/2007 |
| JP | 2009500958 | 1/2009 |
| JP | 2009500984 A | 1/2009 |
| JP | 2009526418 A | 7/2009 |
| JP | 4504934 | 7/2010 |
| JP | 2010537575 | 12/2010 |
| KR | 1020070034060 | 3/2007 |
| RU | 2192049 C1 | 10/2002 |
| RU | 2206177 C1 | 6/2003 |
| RU | 2273050 C2 | 3/2006 |
| RU | 2301444 | 6/2007 |
| TW | I242937 B | 11/2005 |
| TW | I243620 | 11/2005 |
| TW | I246005 B | 12/2005 |
| TW | I246344 B | 12/2005 |
| WO | WO9013211 A1 | 11/1990 |
| WO | WO0069186 A1 | 11/2000 |
| WO | WO0199053 A2 | 12/2001 |
| WO | WO02063900 A1 | 8/2002 |
| WO | WO02063990 A1 | 8/2002 |
| WO | WO02071084 A1 | 9/2002 |
| WO | WO02096132 A1 | 11/2002 |
| WO | WO03017705 A1 | 2/2003 |
| WO | WO03090847 A2 | 11/2003 |
| WO | 2004002208 A2 | 1/2004 |
| WO | WO2004004226 A1 | 1/2004 |
| WO | WO2004017549 A2 | 2/2004 |
| WO | WO2004017568 A1 | 2/2004 |
| WO | WO2004034219 A2 | 4/2004 |
| WO | 2004043008 A1 | 5/2004 |
| WO | WO2004107656 A1 | 12/2004 |
| WO | WO2005036348 A2 | 4/2005 |
| WO | WO2005072183 A2 | 8/2005 |
| WO | 2005086468 A1 | 9/2005 |
| WO | WO2005088874 A1 | 9/2005 |
| WO | WO2005109693 A1 | 11/2005 |
| WO | WO2005116841 A1 | 12/2005 |
| WO | WO2006000239 A1 | 1/2006 |

(56) References Cited

FOREIGN PATENT DOCUMENTS

| WO | WO2006024343 A1 | 3/2006 |
|---|---|---|
| WO | WO2006043901 | 4/2006 |
| WO | WO2006043902 A1 | 4/2006 |
| WO | 2006068878 A1 | 6/2006 |
| WO | WO2006061682 A1 | 6/2006 |
| WO | WO2006117738 A1 | 11/2006 |
| WO | 2007008751 A1 | 1/2007 |
| WO | WO2007004051 A1 | 1/2007 |
| WO | WO2007008574 | 1/2007 |
| WO | WO2007024932 | 3/2007 |
| WO | WO2007047118 A2 | 4/2007 |
| WO | WO2007052249 A2 | 5/2007 |
| WO | WO2007064249 A1 | 6/2007 |
| WO | WO2007090176 | 8/2007 |
| WO | WO2007091699 | 8/2007 |
| WO | WO2008063728 A2 | 5/2008 |
| WO | WO2009026192 | 2/2009 |
| WO | WO2010000870 A1 | 1/2010 |

OTHER PUBLICATIONS

Bharat Bhargava, et al., "Integrating Heterogeneous Wireless Technologies: A Cellular Aided Mobile Ad Hoc Network (CAMA)" Mobile Networks and Applications, Kluwer Academic Publishers, BO, vol. 9, No. 4, Aug. 1, 2004, pp. 393-408, XP019213788.

Cradlepoint Technology, "CTR350 Mobile Broadband Travel Router: Ethernet, USB Modem Support", Dec. 2008.

Cradlepoint Technology, "CTR500 Mobile Broadband Router: Ethernet, USB, and ExpressCard Modem Support" Dec. 2008.

Dilip Krishnaswamy: "AWiMA: An Architecture for Adhoc Wireless Mobile Internet Access" Global Telecommunications Conference, 2008. IEEE GLOBECOM 2008., Nov. 30, 2008, pp. 1-5, XP031370766 IEEE, Piscataway, NJ, USA ISBN: 978-1-4244-2324-8 abstract; figure 1 p. 2, col. 1, paragraph 3—p. 3, col. 2, paragraph 3.3.2; figure 2.

Dimitriadis et al: "Seamless continuity of real-time video across umts and wlan networks: challenges and performance evaluation" IEEE Personal Communications, IEEE Communications Society, US, vol. 12, No. 3, Jun. 1, 2005, pp. 8-18, XP011134871.

Fon Wiki Beta, "Alien, Linus and Bill", http://wiki.fon.com/wiki/alien2%_linus_and_Bill, Feb. 27, 2009.

Fon Wiki Beta, "FON Spot" pp. 1-3, year 2009, http://wiki.fon.com/wiki/FON_Spot.

International Search Report and Written Opinion—PCT/US2010/036263—International Search Authority, European Patent Office,Nov. 15, 2010.

Kyocera, "KR1 Mobile Router: Technical Specifications" 2006 Kyocera Wireless Corp.

Ming, et al., "Ad hoc assisted handoff for real-time voice in IEEE 802.11 infrastructure WLANs" Wireless Communications and Networks Conference, 2004. WCNC. 2004 IEEE Atlanta, GA, USA Mar. 21-25, 2004, Piscaraway, NJ, USA, IEEE, vol. 1, Mar. 21, 2004, p. 202-206.

Park, Mirang et al., "A Study of a Seamless User Authentication Protocol on Wireless LAN Systems," Journal of the Information Processing Society of Japan, The Information Processing Society of Japan, Jul. 15, 2006, 47(7), pp. 2058-2070.

Qiu Ying et al., Peter Marbach: "Bandwidth Allocation in Ad Hoc Networks: a Price-Based Approach" IEEE INFOCOM 2003, [Online] Jul. 3, 2003, pp. 1-11, XP002603370 infocom 2003 Retrieved from the Internet: URL:http://www.i eee-infocom.org/2003/paper s/20_01.PDF> [retrieved on Oct. 4, 2010] p. 1, col. 1, line 9, paragraph 1—p. 4, col. 1, line 20, paragraph II. E p. 9, col. 2, line 5, paragraph VIII—p. 11, col. 1, line 18, paragraph IX.

Sengupta S, et al., "Dynamic pricing for service provisioning and network selection in heterogeneous networks" Physical Communication, vol. 2, No. 1-2, 39-43 Mar. 1, 2009, pp. 138-150, XP026110196 ISSN: 1874-4907 [retrieved on Mar. 9, 2009] abstract.

Sethom, et al: "Secure and seamless mobility support in heterogeneous wireless networks" Global Telecommunications Conference 2005. GLOBECOM '05. IEEE St. Loius, MO, USA, Nov. 28-Dec. 2, 2005, Psicataway, NJ, USA, IEEE. vol. 6, Nov. 28, 2005, pp. 34.

Taiwan Search Report—TW099116854—TIPO—May 12, 2013.

Steiner J.G., et al.,"Kerberos: An Authentication Service for Open Network Systems", Jan. 12, 1988, pp. 1-15.

* cited by examiner

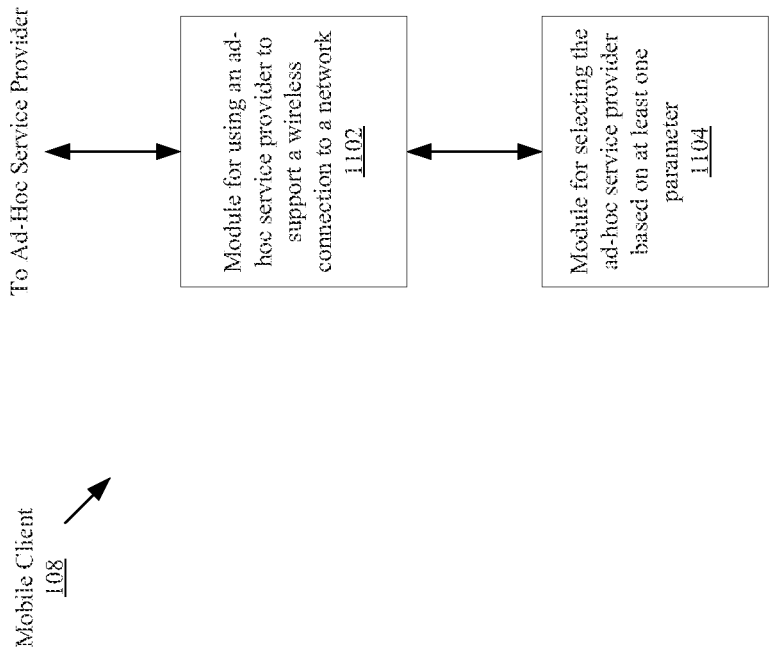

MAXIMIZING SERVICE PROVIDER UTILITY IN A HETEROGENEOUS WIRELESS AD-HOC NETWORK

CROSS REFERENCE TO RELATED APPLICATION

The present application for patent claims priority to Provisional Application No. 61/181,224, entitled "Maximizing Service Provider Utility In A Heterogeneous Wireless Ad-Hoc Network, filed May 26, 2009, the contents of which is expressly incorporated by reference herein.

BACKGROUND

1. Field

The present disclosure relates generally to telecommunications, and more specifically to heterogeneous wireless ad-hoc networks.

2. Background

Wireless telecommunication systems are widely deployed to provide various services to consumers, such as telephony, data, video, audio, messaging, broadcasts, etc. These systems continue to evolve as market forces drive wireless telecommunications to new heights. Today, wireless networks are providing broadband Internet access to mobile subscribers over a regional, a nationwide, or even a global region. Such networks are sometimes referred as Wireless Wide Area Networks (WWANs). WWAN operators generally offer wireless access plans to their subscribers such as subscription plans at a monthly fixed rate.

Accessing WWANs from all mobile devices may not be possible. Some mobile devices may not have a WWAN radio. Other mobile devices with a WWAN radio may not have a subscription plan enabled. Ad-hoc networking allows mobile devices to dynamically connect over wireless interfaces using protocols such as WLAN, Bluetooth, UWB or other protocols. There is a need in the art for a methodology to allow a user of a mobile device without WWAN access to dynamically subscribe to wireless access service provided by a user with a WWAN-capable mobile device using wireless ad-hoc networking between the mobile devices belonging to the two users.

SUMMARY

In one aspect of the disclosure, an ad-hoc service provider includes a processing system configured to support a wireless connection to the network, the processing system being further configured to provide access to the network for one or more mobile clients and to allocate bandwidth to the one or more mobile clients for accessing the network based on at least one parameter related to the effect on the ad-hoc service provider for providing such access. The ad-hoc service provider also includes a user interface configured to provide a user with access to the network through the processing system.

In another aspect of the disclosure, a mobile client includes a processing system configured to use an ad-hoc service provider to support a wireless connection to the network, the processing system being further configured to select the ad-hoc service provider based on at least one parameter related to the ad-hoc service provider's ability to support the wireless connection.

In a further aspect of the disclosure, an ad-hoc service provider includes means for supporting a wireless connection to a network, means for providing access to the network for one or more mobile clients, means for allocating bandwidth to the one or more mobile clients for accessing the network based on at least one parameter related to the effect on the ad-hoc service provider for providing such access, and means for providing a user with access to the network through the ad-hoc service provider.

In yet a further aspect of the disclosure, a mobile client includes means for using an ad-hoc service provider to support a wireless connection to a network, and means for selecting the ad-hoc service provider based on at least one parameter related to the ad-hoc service provider's ability to support the wireless connection.

In another aspect of the disclosure, a method of communications includes supporting a wireless connection from an ad-hoc service provider to a network, providing access to the network for one or more mobile clients, allocating bandwidth to the one or more mobile clients for accessing the network based on at least one parameter related to the effect on the ad-hoc service provider for providing such bandwidth, and providing a user with access to the network through the ad-hoc service provider.

In yet another aspect of the disclosure, a method of communications includes using an ad-hoc service provider to support a wireless connection from a mobile client to a network, and selecting the ad-hoc service provider based on at least one parameter related to the ad-hoc service provider's ability to support the wireless connection.

It is understood that other aspects of the disclosure will become readily apparent to those skilled in the art from the following detailed description, wherein various aspects of heterogeneous wireless ad-hoc networks are shown and described by way of illustration. As will be realized, these aspects of the disclosure may be implemented in other and different configurations and its several details are capable of modification in various other respects. Accordingly, the drawings and detailed description are to be regarded as illustrative in nature and not as restrictive.

BRIEF DESCRIPTION OF THE DRAWINGS

FIG. 11 is a simplified diagram illustrating an example of the functionality of a mobile client.

DETAILED DESCRIPTION

The detailed description set forth below in connection with the appended drawings is intended as a description of various aspects of heterogeneous wireless ad-hoc networks and is not intended to represent the only implementations to which such aspects apply. As those skilled in the art will readily understand, the various aspects of heterogeneous wireless ad-hoc networks described throughout this disclosure may be extended to other telecommunication applications. The detailed description includes specific details for the purpose of providing a thorough understanding of the various concepts presented throughout this disclosure. However, it will be apparent to those skilled in the art that various aspects of heterogeneous wireless ad-hoc networks may be practiced without these specific details. In some instances, well-known structures and components are shown in block diagram form in order to avoid obscuring the various concepts presented throughout this disclosure.

Figure 1:
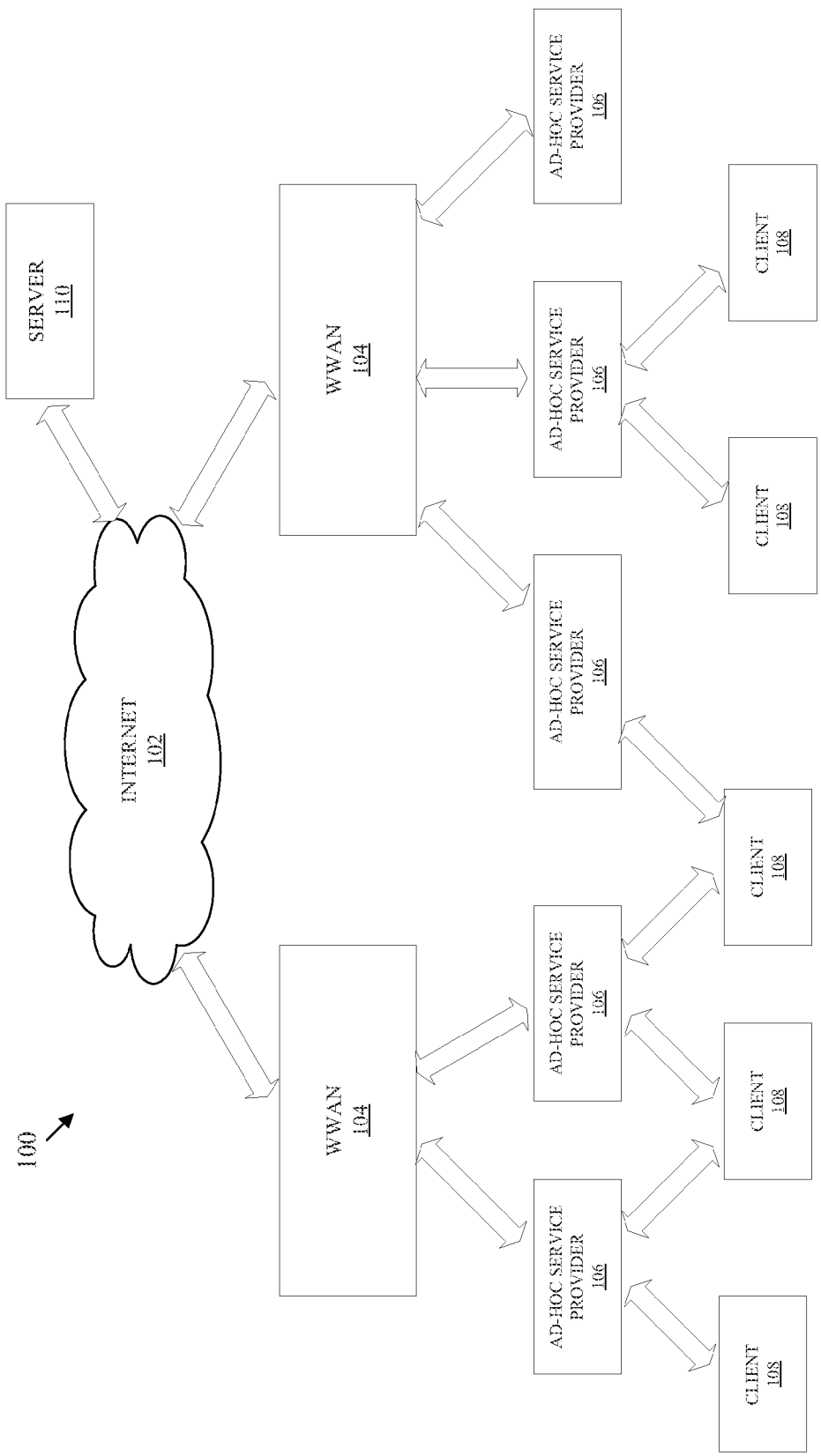
FIG. 1 is a simplified block diagram illustrating an example of a telecommunications system.

FIG. 1 is a simplified block diagram illustrating an example of a telecommunications system. The telecommunications system 100 is shown with multiple WWANs that provide broadband access to a network infrastructure 102 for mobile subscribers. The network infrastructure 102 may be a packet-based network such as the Internet or some other suitable network infrastructure. For clarity of presentation, two WWANs 104 are shown with a backhaul connection to the Internet 102. Each WWAN 104 may be implemented with multiple fixed-site base stations (not shown) dispersed throughout a geographic region. The geographic region may be generally subdivided into smaller regions known as cells. Each base station may be configured to serve all mobile subscribers within its respective cell. A base station controller (not shown) may be used to manage and coordinate the base stations in the WWAN 104 and support the backhaul connection to the Internet 102.

Each WWAN 104 may use one of many different wireless access protocols to support radio communications with mobile subscribers. By way of example, one WWAN 104 may support Evolution-Data Optimized (EV-DO), while the other WWAN 104 may support Ultra Mobile Broadband (UMB). EV-DO and UMB are air interface standards promulgated by the 3rd Generation Partnership Project 2 (3GPP2) as part of the CDMA2000 family of standards and employs multiple access techniques such as Code Division Multiple Access (CDMA) to provide broadband Internet access to mobile subscribers. Alternatively, one of WWAN 104 may support Long Term Evolution (LTE), which is a project within the 3GPP2 to improve the Universal Mobile Telecommunications System (UMTS) mobile phone standard based primarily on a Wideband CDMA (W-CDMA) air interface. One of WWAN 104 may also support the Worldwide Interoperability for Microwave Access (WiMAX) standard being developed by the WiMAX forum. The actual wireless access protocol employed by a WWAN for any particular telecommunications system will depend on the specific application and the overall design constraints imposed on the system. The various concepts presented throughout this disclosure are equally applicable to any combination of heterogeneous or homogeneous WWANs regardless of the wireless access protocols utilized.

Each WWAN 104 has a number of mobile subscribers. Each subscriber may have a mobile node capable of accessing the Internet 102 directly through the WWAN. These mobile nodes may access the WWAN 104 using a EV-DO, UMB, LTE or some other suitable wireless access protocol.

One or more of these mobile nodes may be configured to create in its vicinity an ad-hoc network based on the same or different wireless access protocol used to access the WWAN 104. By way of example, a mobile node may support a UMB wireless access protocol with a WWAN, while providing an IEEE 802.11 access point for mobile nodes that cannot directly access a WWAN. IEEE 802.11 denotes a set of Wireless Local Access Network (WLAN) standards developed by the IEEE 802.11 committee for short-range communications (e.g., tens of meters to a few hundred meters). Although IEEE 802.11 is a common WLAN wireless access protocol, other suitable protocols may be used.

A mobile node that may be used to provide an access point for another mobile node will be referred to herein as an "ad-hoc service provider" 106. A mobile node that uses an ad-hoc service provider 106 to access a WWAN 104 will be referred to herein as a "mobile client" 108. A mobile node, whether an ad-hoc service provider 106 or a mobile client 108, may be a laptop computer, a mobile telephone, a personal digital assistant (PDA), a mobile digital audio player, a mobile game console, a digital camera, a digital camcorder, a mobile audio device, a mobile video device, a mobile multimedia device, or any other device capable of supporting at least one wireless access protocol.

The ad-hoc service provider 106 may extend its wireless Internet access service to mobile clients 108 that would otherwise not have Internet access. A server 110 may be used as an "exchange" to enable mobile clients 108 to purchase unused bandwidth from ad-hoc service providers 106 to access, for example, the Internet 102 across WWANs 104. The server may reside anywhere in the telecommunications system 100 such that all WWANs 104 can connect to it. The server may be a centralized server or a distributed server. The centralized server may be a dedicated server or integrated into another entity such as a desktop or laptop computer, or a mainframe. The distributed server may be distributed across multiple servers and/or one or more other entities such as a laptop or desktop computer, or a mainframes. In at least one configuration, the server 110 may be integrated, either in whole or part, into one or more ad-hoc service providers.

In one configuration of a telecommunications system 100, the server 110 charges the mobile clients 108 based on usage. For the occasional user of mobile Internet services, this may be an attractive alternative to the monthly fixed rate wireless access plans. The revenue generated from the usage charges may be allocated to the various entities in the telecommunications system 100 in a way that tends to perpetuate the vitality of the exchange. By way of example, a portion of the revenue may be distributed to the ad-hoc service providers, thus providing a financial incentive for mobile subscribers to become ad-hoc service providers. Another portion of the revenue may be distributed to the WWAN operators to compensate them for the bandwidth that would otherwise go unutilized. Another portion of the revenue may be distributed to the manufacturers of the mobile nodes.

The server 110 may be implemented as a trusted server. It can therefore be authenticated, for example, using a Public Key Infrastructure (PKI) certificate in a Transport Layer Security (TLS) session between the server 110 and an ad-hoc service provider 106, or between the server 110 and a mobile client 108. Alternatively, the server 110 may be authenticated using self-signed certificates or by some other suitable means.

Regardless of the manner in which the server 110 is authenticated, a secure session channel may be established between the server 110 and an ad-hoc service provider 106, or between the server 110 and a mobile client 108, during registration. In one configuration of a telecommunications system 100, a mobile client 108 may register with the server 110 to set up a user name and password with payment information. An ad-hoc service provider 106 may register with the server 110 to notify its desire to provide a wireless access point (e.g., an Internet access point) to mobile clients 108.

The server 110 may also be used to provide admission control. Admission control is the process whereby the server 110 determines whether to allow an ad-hoc service provider 106 to provide service within a geographic location. The server 110 may limit the number of ad-hoc service providers 106 at a given location if it determines that additional ad-hoc service providers 106 will adversely affect performance in the WWAN. Additional constraints may be imposed by the WWAN operators that may not want its mobile subscribers to provide service in a given geographic location depending on various network constraints.

The server 110 may also be used to manage dynamic sessions that are established between the ad-hoc service providers 106 and the mobile clients 108. In one configuration of the telecommunications system 100, Extensible Authentication Protocol-Tunneled Transport Layer Security (EAP-TTLS) may be used for Authentication, Authorization and Accounting (AAA) and secure session establishment for a connection initiated by an ad-hoc service provider 106 with the server 110 when the ad-hoc service provider 106 is mobile and desires to provide service. EAP-TTLS may also be used for a session initiation request by a mobile client 108. In the latter case, the mobile client is the supplicant, the ad-hoc service provider 106 is the authenticator, and the server 110 is the authentication server. The ad-hoc service provider 106 sends the mobile client's credentials to the server 110 for EAP-AAA authentication. The EAP-TTLS authentication response from the server 110 is then used to generate a master shared key. Subsequently, a link encryption key may be established between the ad-hoc service provider 106 and the mobile client 108.

Additional security may be achieved with a Secure Sockets Layer Virtual Private Network (SSL VPN) tunnel between a mobile client 108 and the server 110. The SSL VPN tunnel is used to encrypt traffic routed through an ad-hoc service provider 106 to provide increased privacy for a mobile client 108. Alternatively, the tunnel may be an IPsec tunnel or may be implemented using some other suitable tunneling protocol.

Once the tunnel is established between the server 110 and the mobile client 108, various services may be provided. By way example, the server 110 may support audio or video services to the mobile client 108. The server 110 may also support advertising services to the mobile client 108. Other functions of the server 110 include providing routing to and from the network for mobile client 108 content as well as providing network address translation to and from the network for the mobile client 108.

The server 110 may also be used to store a quality metric for each ad-hoc service provider 106. This quality metric may be provided to the mobile clients 108 who may want to choose from available ad-hoc service providers 106. This metric may be continuously updated as more information becomes available about a specific ad-hoc service provider 106. The quality metric associated with each ad-hoc service provider 106 may be decreased or increased based on the QoS provided.

Due to the mobility of the ad-hoc service providers 106 and the mobile clients 106, handoff of a mobile client from one ad-hoc service provider to another may be required. The server 110 may be configured to support the handoff of a mobile client 108 across different wireless access protocols for the backhaul. More specifically, the server 110 may be used to enable a mobile client 108 to move from one ad-hoc service provider 106 with a given wireless access protocol for the backhaul (e.g., EV-DO) to another ad-hoc service provider 106 with a different wireless access protocol for the backhaul (e.g., UMB).

Figure 2:
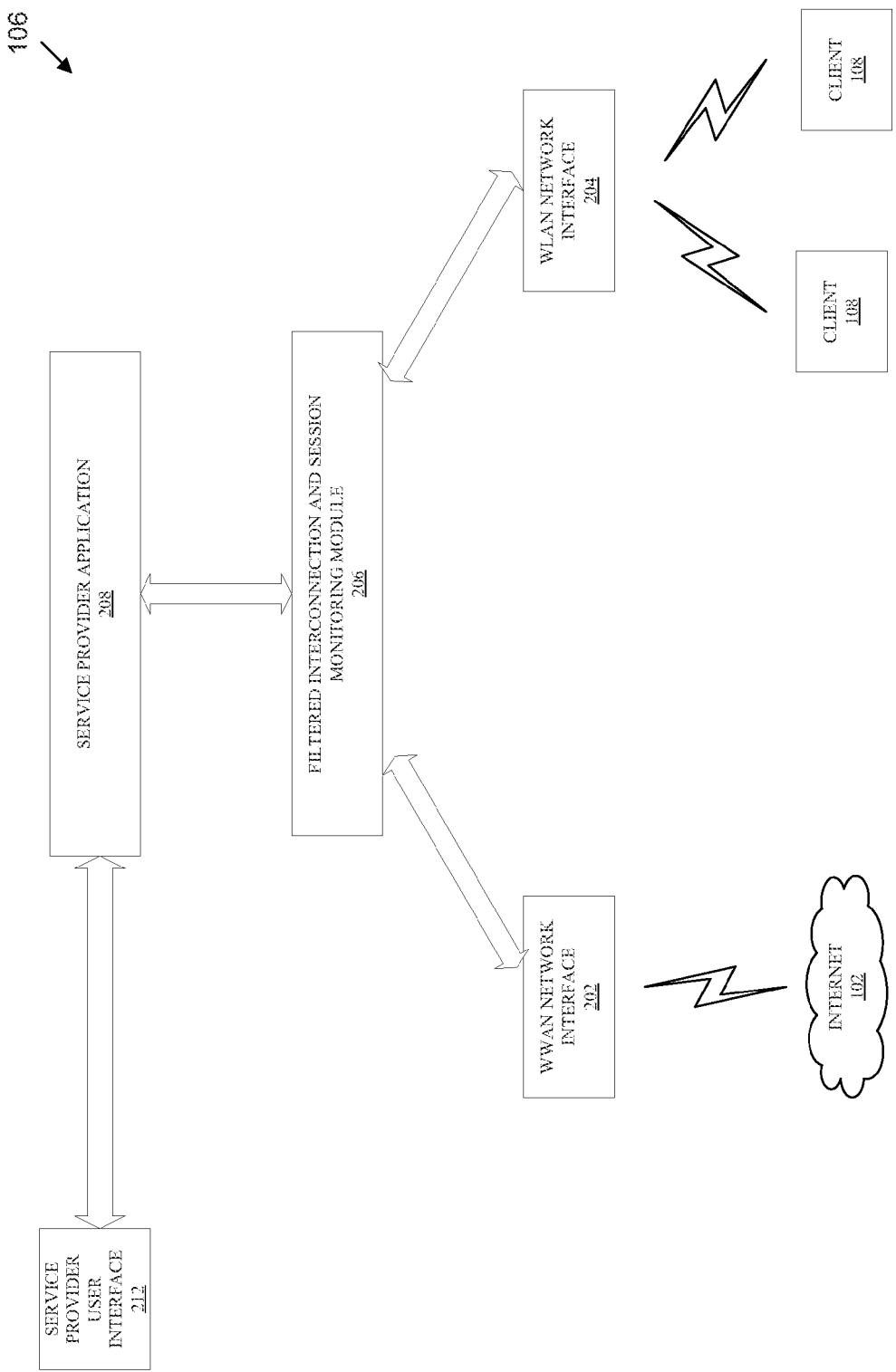
FIG. 2 is a simplified block diagram illustrating an example of the functionality of an ad-hoc service provider.

FIG. 2 is a simplified block diagram illustrating an example of the functionality of an ad-hoc service provider. As discussed above, the ad-hoc service provider 106 may have the ability to bridge wireless links over homogeneous or heterogeneous wireless access protocols. This may be achieved with a WWAN network interface 202 that provides a means for supporting a wireless connection to the WWAN by supporting a wireless access protocol for a WWAN to the Internet 102, and a WLAN network interface 204 that provides a wireless access point for mobile clients 108. By way of example, the WWAN network interface 202 may include a transceiver function that supports EV-DO for Internet access through a WWAN, and the WLAN network interface 204 may include a transceiver function that provides an 802.11 access point for mobile clients 108. More generally, each of the WWAN and WLAN network interfaces 202, 204 may be configured to implement the physical layer by providing the means to transmit data in accordance with the physical and electrical specifications required to interface to its respective transmission medium. Each of the WWAN and WLAN network interfaces 202, 204 may also be configured to implement the lower portion of the data link layer by managing access to its respective transmission medium.

The ad-hoc service provider 106 is shown with a filtered interconnection and session monitoring module 206. The module 206 provides filtered processing of content from mobile clients 108 so that the interconnection between the WWAN and WLAN interfaces 202, 204 is provided only to mobile clients 108 authenticated and permitted by the server to access the WWAN. The module 206 also maintains tunneled connectivity between the server and the authenticated mobile clients 108.

The ad-hoc service provider 106 also includes a service provider application 208 that provides, among other things, a means for providing access to the network for one or more mobile clients and a means for allocating bandwidth to the one or more mobile clients for accessing the network based on at least one parameter related to the effect on the ad-hoc service provider for providing such access. The ad-hoc service provider 106 also includes a user interface 212 that provides a means for providing a user with access to the WWAN through the ad-hoc service provider. The user interface 212 may include a keypad, display, speaker, microphone, joystick, and/or any other combination user interface devices.

As discussed above, the service provider application 208 enables the module 206 to provide ad-hoc services to mobile clients 108. The service provider application 208 maintains a session with the server to exchange custom messages with the server. In addition, the service provider application 208 also maintains a separate session with each mobile client 108 for exchanging custom messages between the service provider application 208 and the mobile client 108. The service provider application 208 provides information on authenticated and permitted clients to the filtered interconnection and session monitoring module 206. The filtered interconnection and session monitoring module 208 allows content flow for only authenticated and permitted mobile clients 108. The filtered interconnection and session monitoring module 206 also optionally monitors information regarding content flow related to mobile clients 108 such as the amount of content outbound from the mobile clients and inbound to the mobile clients, and regarding WWAN and WLAN network resource utilization and available bandwidths on the wireless channels. The filtered interconnection and session monitoring module 206 can additionally and optionally provide such information to the service provider application 208. The service provider application 208 can optionally act on such information and take appropriate actions such as determining whether to continue maintaining connectivity with the mobile clients 108 and with the server, or whether to continue to provide service. It should be noted that the functions described in modules 206 and 208 can be implemented in any given platform in one or multiple sets of modules that coordinate to provide such functionality at the ad-hoc service provider 106.

When the ad-hoc service provider 106 decides to provide these services, the service provider application 208 sends a request to the server for approval. The service provider application 208 requests authentication by the server and approval from the server to provide service to one or more mobile clients 108. The server may authenticate the ad-hoc service provider 106 and then determine whether it will grant the ad-hoc service provider's request. As discussed earlier, the request may be denied if the number of ad-hoc service providers in the same geographic location is too great or if the WWAN operator has imposed certain constraints on the ad-hoc service provider 106.

Once the ad-hoc service provider 106 is authenticated, the service provider application 208 may advertise an ad-hoc WLAN Service Set Identifier (SSID). Interested mobile clients 108 may associate with the SSID to access the ad-hoc service provider 106. The service provider application 208 may then authenticate the mobile clients 108 with the server and then configure the filtered interconnection and session monitoring module 206 to connect the mobile clients 108 to the server. During the authentication of a mobile client 108, the service provider application 208 may use an unsecured wireless link.

The service provider application 208 may optionally choose to move a mobile client 108 to a new SSID with a secure link once the mobile client 108 is authenticated. In such situations, the service provider application 208 may distribute the time it spends in each SSID depending on the load that it has to support for existing sessions with mobile clients 108.

The service provider application 208 may also be able to determine whether it can support a mobile client 108 before allowing the mobile client 108 to access a network. Resource intelligence that estimates the drain on the battery power and other processing resources that would occur by accepting a mobile client 108 may assist in determining whether the service provider application 208 should consider supporting a new mobile client 108 or accepting a handoff of that mobile client 108 from another ad-hoc service provider.

The service provider application 208 may admit mobile clients 108 and provide them with a certain QoS guarantee, such as an expected average bandwidth during a session. Average throughputs provided to each mobile client 108 over a time window may be monitored. The service provider application 208 may monitor the throughputs for all flows going through it to ensure that resource utilization by the mobile clients 108 is below a certain threshold, and that it is meeting the QoS requirement that it has agreed to provide to the mobile clients 108 during the establishment of the session.

The service provider application 208 may also provide a certain level of security to the wireless access point by routing content through the filtered interconnection and session monitoring module 206 without being able to decipher the content. Similarly, the service provider application 208 may be configured to ensure content routed between the user interface 210 and the WWAN 104 via the module 206 cannot be deciphered by mobile clients 108. The service provider application 208 may use any suitable encryption technology to implement this functionality.

The service provider application 208 may also maintain a time period for a mobile client 108 to access the WWAN. The time period may be agreed upon between the service provider application 208 and the mobile client 108 during the initiation of the session. If the service provider application 208 determines that it is unable to provide the mobile client 108 with access to the network for the agreed upon time period, then it may notify both the server and the mobile client 108 regarding its unavailability. This may occur due to energy constraints (e.g., a low battery), or other unforeseen events. The server may then consider a handoff of the mobile client to another ad-hoc service provider, if there is such an ad-hoc service provider in the vicinity of the mobile client 108. The service provider application 208 may support the handoff of the mobile client 108.

The service provider application 208 may also dedicate processing resources to maintain a wireless link or limited session with mobile clients 108 served by other ad-hoc service providers. This may facilitate the handoff of mobile clients 108 to the ad-hoc service provider 106.

The service provider application 208 may manage the mobile client 108 generally, and the session specifically, through the user interface 212. Alternatively, the service provider application 208 may support a seamless operation mode with processing resources being dedicated to servicing mobile clients 108. In this way, the mobile client 108 is managed in a way that is transparent to the mobile subscriber. The seamless operation mode may be desired where the mobile subscriber does not want to be managing mobile clients 108, but would like to continue generating revenue by sharing bandwidth with mobile clients 108.

The service provider application 208 may use a utility function and an availability function to determine the amount of bandwidth to provide to mobile clients 108. Examples of various algorithms that may be implemented by the service provider application 208 to determine the amount of bandwidth to provide will now be presented with the understanding that the other algorithms may be implemented depending on the particular application and the design constraints imposed on the ad-hoc service provider 106 and/or the overall telecommunications system.

In one configuration of an ad-hoc service provider 106, the service provider application 208 may maximize a utility function $U(x)$ that is a function of the revenue $R(x)$ to the ad-hoc service provider 106 for the bandwidth allocated to the mobile clients 108, the energy $E(x)$ required by the ad-hoc service provider 106 to provide the allocated bandwidth to the mobile clients, the loss of bandwidth $B(x)$ that would otherwise be available to the user of the ad-hoc service provider 106 to access the network, the processing resources $P(x)$ required by the ad-hoc service provider 106 to provide the allocated bandwidth to the mobile clients 108, and the quality of service metric and/or a goodness metric $G(x)$. The quality of service metric and/or goodness metric $G(x)$ may be considered by the service provider application 208 because it may want to maintain a high quality of service metric or maintain a high perceived level of goodness even though it may compromise the ad-hoc service provider 106 from an energy perspective to provide service. In this example, $U(x)$ could take an additive form such as:

$$U(x)=\alpha_1 R(x)-\alpha_2 E(x)-\alpha_3 B(x)-\alpha_4 P(x)+\alpha_5 G(x).$$

Alternatively, $U(x)$ could take a multiplicative form such as:

$$U(x)=R(x)G(x)/E(x)B(x)P(x).$$

Alternatively, U(x) could take a simplified multiplicative form such as:

$$U(x) = R(x)/E(x).$$

Those skilled in the art will readily recognize other additive and/or multiplicative forms that are appropriate for the utility function depending upon the particular application. The term $\alpha_2$ is a function of available energy that could be an increasing step or linear or sigmoid function of the current energy state. R(x), E(x), G(x), B(x), P(x) could also take up linear, sigmoid, other functional forms. A linear functional form could take on a form $\beta x + \gamma$. A sigmoidal functional form could take on a form:

$$K(x, \delta, \lambda) = 1/(1 + e^{-\lambda(x-\delta)})$$

where: $K'(x, \delta, \lambda) = -\lambda e^{-\lambda(x-\delta)}/(1 + e^{-\lambda(x-\delta)})^2$.

By way of example, the utility function could take on the form:

$$U(x) = \alpha_1 x - \alpha_2(\beta_2 x + \gamma_2) - \alpha_3 K(x, \delta_1, \lambda_1) - \alpha_4 K(x, \delta_2, \lambda_2) + \alpha_5(\beta_5 x + \gamma_5).$$

Based on an available battery energy y, $\alpha_2$ could be a sigmoid of the form $K(y, \delta_3, \lambda_3)$. Therefore, implicitly U(x) is a function of both x and y, i.e. U(x,y). However, available energy y could be assumed to be fixed to determine U(x) for a given fixed y. The utility function U(x) could be a joint non-linear function of its different dependencies of available energy, available bandwidth, revenue, quality-of-service, processing costs, etc. as well. For example, the dependence on an available bandwidth x and an available energy y, could take on a two dimensional sigmoid dependence as follows:

$$L(x, y, \delta 1, \delta 1, \lambda 1, \lambda 2) = 1/(1 + e^{-\lambda 1(x-\delta 1)} e^{-\lambda 2(y-\delta 2)})$$

Such a two-dimensional sigmoid captures a continuous dependence on both available energy and available bandwidth. For example, ignoring processing costs and QoS/goodness costs, U(x,y) could be of the form:

$$U(x,y) = R(x) - (\beta_2 x + \gamma_2) \alpha_3/(1 + e^{-\lambda 1(x-\delta 1)} e^{-\lambda 2(y-\delta 2)})$$

to represent its dependence on R(x) and a joint non-linear function of available energy and available bandwidth. Alternatively, using a reciprocal relationship:

$$U(x,y) = R(x)/[(\beta_2 x + \gamma_2) \alpha_3/(1 + e^{-\lambda 1(x-\delta 1)} e^{-\lambda 2(y-\delta 2)})].$$

The loss of bandwidth function B(x) reflects the impact to the ad-hoc service provider 106 when it allocates bandwidth x to mobile clients 108, relative to its available WWAN backhaul bandwidth. It is possible that small values of x may have very little impact on the ad-hoc service provider 106, while large values of x may have a significant impact. Therefore, the function $K(x, \delta_1, \lambda_1)$ was chosen in the above example to reflect this.

The utility function is maximized when $U'(x) = 0$. For the last example, the utility function is maximized when:

$$U'(x) = \alpha_1 - \alpha_2 \beta_2 - \alpha_3 K'(x, \delta_1, \lambda_1) - \alpha_4 K'(x, \delta_2, \lambda_2) + \alpha_5 \beta_5 = 0.$$

The solution to $U'(x) = 0$ determines the value of x that the service provider application 208 can choose to use to provide service to mobile clients 108. Therefore, based on the current state of the telecommunications system, each ad-hoc service provider 106 may be able to support a different amount of bandwidth x.

As explained above, the utility function U(x) is a function of, among other things, the revenue R(x) to the ad-hoc service provider 106 for the bandwidth allocated to the mobile clients 108. The revenue R(x) to the ad-hoc service provider 106 is function of pricing. In one configuration, the service provider application 208, the pricing may be set based on its available bandwidth for mobile clients 108 and/or the differential pricing relative to other ad-hoc service providers.

The service provider application 208 may use an availability function A(t) to determine whether an ad-hoc service provider 106 is available or not, or the degree to which it is available. The ad-hoc service provider 106 is assumed to start providing service at t=0. Then the availability function A(t) could be defined such that:

$$A(t) = 1, \text{ when } 0 < t <= t1$$
$$= 0, \text{ when } t > t1$$

Alternatively, $$A(t) = 1, \text{ when } 0 < t <= t1$$
$$= g(t, t1, t2) \text{ when } t1 <= t <= t2$$
$$= 0 \text{ when } t > t2,$$

where g(t, t1,t2) is a decreasing function of time bounded between 1 and 0 in the time interval [t1, t2]. For example g(t, t1, t2) could be (t−t2)/(t1−t2).

Based on its availability and the current value of the utility function U(x), an ad-hoc service provider 106 may choose to handoff or terminate service when the product of the availability and utility function falls below a given threshold $\mu$ (A(t) U(x) < $\mu$). By way of example, the availability function A(t) may be 1 but the utility function U(x) may fall below a threshold value. Alternatively, the utility function U(x) may be high but the availability function A(t) may start dropping. When there are multiple mobile clients 108 for which the ad-hoc service provider 106 is providing service, then the ad-hoc service provider 106 can determine x such that A(t)U(x) > $\mu$. It can continue to sustain a subset of mobile clients 108 whose aggregated bandwidth x allows A(t)U(x) > $\mu$. The ad-hoc service provider 106 can hand off the remaining mobile clients 108 or suspend providing service for those remaining mobile clients 108. If mobile clients 108 have different priorities in terms of quality of service, then mobile clients 108 with higher priorities can be retained, and the others handed off Several examples will now be presented to illustrate a pricing scenario that may be implemented by the service provider application 208.

In this example, the total available bandwidth is W for the WWAN link from the ad-hoc service provider 106 (excluding the needs of the service provider). The short range link between mobile client 108 and ad-hoc service provider 106 has capacity Ws. Then the available capacity for the session is Wmin=min (W, Ws). If the cost is affordable to a mobile client 108, and a mobile client 108 session needs bandwidth x Mbps where x<Wmin, then a mobile client 108 can be admitted. Typically, it is expected that the Wmin=W, with the short range link being of higher capacity. Assuming, by way of example, if the ad-hoc service provider 106 desires revenue $\alpha + \beta x$ when its true cost is $\alpha_{true} + \beta_{true} x$, and the mobile client 108 is willing to pay $\alpha_C + \beta_C x < \alpha + \beta x$. If $\alpha_C + \beta_C x > \alpha_{true} + \beta_{true} x$, then the mobile client 108 and the ad-hoc service provider 106 could negotiate a price that results in a profitable service for the ad-hoc service provider 106.

Assuming that $b_{min}$ is the minimum bandwidth for a session, and $p_{min}$ is associated price, then pricing can be of the form $p_{min}+\beta(x-b_{min})$. In this case, pricing is a 4-tuple ($p_{min}$, $b_{min}$, x, $\beta$). In general, the ad-hoc service provider 106 can announce (p, b) pairs (pricing, bandwidth) pairs for service options in its beacons. Alternatively, it can announce the 4-tuple (assuming linear dependence). The mobile client's willingness to pay can be different sets of (p,b) pairs typically with diminishing returns for the mobile client 108 as b increases (non-linear). A mobile client 108 and an ad-hoc service provider 106 may negotiate for a session if their respective (p,b) pairs are reasonably close to each other, so that an appropriate price p can be determined for a desired bandwidth b.

Another example will be presented where one ad-hoc service provider 106 serves multiple mobile clients 108. Assuming that W=WWAN bandwidth available for mobile clients 108 at ad-hoc service provider 106 and the ad-hoc service provider 106 itself needs B, then the WWAN support for (W+B) with the allocation of W left to available mobile clients 108. This can be treated as the solution to a binary knapsack problem: "Given n items with price $p_i$ and weight $w_i$, select a subset X of items such that $\Sigma_{j \in X} p_j$ is maximized, such that $\Sigma_{j \in X} w_j < W$". Here, the weight $w_i$ is the desired bandwidth for mobile client 108$i$. The problem can be solved using dynamic programming by finding an allocation for W=0, then W=1, then W=2, and gradually building the table for all values of W, to pick a solution that maximizes the sum over prices. The execution time is O(nW) where the size of W can be of the order of $2^n$. Instead, consider options for W in increments of $\Delta w$ kbps (such as in steps of 50 kbps) ($\Delta w$ can be greatest common divisor of desired bandwidths of different clients). The dynamic programming solution process will use all previous solutions in increments of $\Delta w$ kbps. The number of steps=O(W/$\Delta w$) and the algorithm has complexity O(nW/$\Delta w$). An exact solution may be available at a point that is between two solved values of W. One can explore refining bucket-size within neighborhood of obtained solution to refine the solution further if desired.

An example will now be presented to illustrate a pricing scenario that may be implemented by the service provider application 208 in the presence of multiple ad-hoc service providers 106. In this example, there are multiple ad-hoc service providers $106_1$, $106_2$, $106_3$, ..., $106_N$ that can service the same mobile client 108. The effective data rate that is available at the ad-hoc service provider 106, to support the mobile client 108 is given by $x_i$ Mbps. The advertised price by the ad-hoc service providers is $P_1$, $P_2$, $P_3$, ..., $P_N$, respectively, for sessions of the same duration. There is a pressure to increase price to reduce demand based on the load at an ad-hoc service provider 106. At the same time, reduced prices at other ad-hoc service providers 106 can cause a ad-hoc service provider 106 to lower its prices. Likewise, an ad-hoc service provider 106 that is charging a low price may charge a higher price if other ad-hoc service providers 106 are charging more for similar service. With multiple ad-hoc service providers 106, pricing by a service provider can depend on price suggested by other service providers, and the bandwidth to be supported for the mobile client 108. Therefore $P_i = f(x_i, \Delta P_{ij} \forall j)$.

To understand how to determine the pricing with multiple ad-hoc service providers 106, a general formulation is presented to derive a utility function based on observed information from other ad-hoc service providers 106. For example, observed information could include pricing and goodness metrics from different ad-hoc service providers 106. We may then apply this general approach to the simpler case where only price information from different ad-hoc service providers 106 is observed.

In this example, all ad-hoc service providers 106 compute utilities $U_i$ based on local constraints $f_i(x)$ and information that they receive from other ad-hoc service providers 106. An example is given by the formula:

$$U_i(x, U) = f_i(x) + (1/N)\Sigma_j \mu_{ij}(U_i - U_j),$$

Let $O_i$ be an observable metric associated with ad-hoc service provider 106$i$ that other mobile nodes can observe. This could include the current price $P_i$, the goodness metric $G_i$ or a ratio of $P_i$ to $G_i$. For example, $O_i$ may equate to $P_i/G_i$ (pricing to goodness ratio). As a further example, $O_i$ may equate to $f_i(x_i, O)$. If $O_i$ could be expressed as:

$$O_i = g_i(x_i) - \mu(1/N)\Sigma_j(O_i - O_j),$$

where $\mu_i \geq 0$, then:

$$(1+\mu)O_i = g_i(x_i) + \mu(1/N)\Sigma_j O_j.$$

Let $(1/N)\Sigma_i O_j = Q$, then:

$$(1+\mu)O_i = g_i(x_i) + \mu Q; \text{ and}$$

$$O_i = (g_i(x_i) + \mu Q)/(1+\mu).$$

Since $\Sigma_i O_i = NQ$, $$(1+\mu)NQ = \Sigma_i g_i(x_i) + \mu N Q$$

$$Q = (1/N)\Sigma_i g_i(x_i)$$

Thus, it is observed that the average over observable metrics is equal to the average over internal constraint functions. Q could vary dynamically, but slowly in general. In a sense, it could be treated as equivalent to a mean "center of gravity" for the entire system of ad-hoc service providers 106.

An example of the problem of price determination $P_i = f(x_i, \Delta P_{ij})$, where $P_i$'s are the observed metrics, will now be presented. $P_i$ could be expressed as:

$$P_i = \kappa_i + \lambda_i x_i - \sum_{j, j \neq i}(\mu_{ij}(P_i - P_j))$$

where $\kappa_i$, $\lambda_i$, $\mu_{ij}$ are all $\geq 0$. For simplicity that $\mu_{ij} = \mu \forall i, j$, then:

$$(1 + (N-1)\mu)P_i = \kappa_i + \lambda_i x_i + \mu \sum_{j, j \neq i} P_j$$

$$(1 + N\mu)P_i = \kappa_i + \lambda_i x_i + \mu \sum_j P_j$$

Let $$\sum_j P_j = Q,$$

then:

$$(1 + N\mu)P_i = \kappa_i + \lambda_i x_i + \mu Q$$

$$(1 + N\mu)Q = \sum_i(\kappa_i + \lambda_i x_i) + \mu N Q$$

$$Q = \sum_i(\kappa_i + \lambda_i x_i)$$

If $\lambda_i = \lambda \forall i$, then:

$$Q = \sum_i (\kappa_i) + \lambda \sum_i x_i$$

This implies that:

$$P_j = (\kappa_i + \lambda_j x_i + \mu Q)/(1 + N\mu).$$

Thus the pricing at a node is a function of its local constraints, and dynamics of a mean observable metric associated with the other service providers.

If all ad-hoc service providers 106 have complete information about other ad-hoc service providers 106, they could each determine a price for their service. Ad-hoc service providers 106 could monitor each other's beacons to get such information. Alternatively, ad-hoc service providers 106 could masquerade as mobile clients 108 to obtain information about other ad-hoc service providers 106. However, it is likely that ad-hoc service providers 106 may not have information about other ad-hoc service providers 106 (some potential ad-hoc service providers 106 for a mobile client 108 may be out of range from a given potential ad-hoc service provider 106). One possibility is for ad-hoc service providers 106 to provide their respective information to the server 110 (see FIG. 1) and allow the server 110 to compute pricing. This would allow for a co-operative pricing strategy.

In the absence of complete information, but in the presence of just pricing information $P_j$, an ad-hoc service provider 106 could employ an equation to determine an optimal price. This can lead to a dynamic Nash equilibrium as each ad-hoc service provider 106 modifies its price based on observations of pricing suggested by other ad-hoc service providers 106, with incomplete information about the other ad-hoc service providers 106. In absence of any information from other ad-hoc service providers 106 or assistance from the server 110 (see FIG. 1), an ad-hoc service provider 106 could merely maximize its utility function U(x) to determine its operating point, and suggest a pricing and supportable bandwidth based on the outcome of processing U'(x)=0 on its platform.

Revenue from a mobile client 108 based on the total price P that is charged for service may be distributed as the revenue R(x) for the ad-hoc service provider 106, revenue $R_{Network}$ for the network operator, and revenue $R_{Server}$ for the server, where $$P = R_{Server} + R_{Network} + R(x).$$

Therefore, $$R(x) = P - R_{Server} + R_{network}.$$

Maximizing the price P then maximizes the revenue R(x) contribution to the utility function U(x) for the ad-hoc service provider 106, thereby maximizing the utility function of the ad-hoc service provider 106 with all other factors in the utility function remaining fixed.

The server 110 (see FIG. 1) may have a fixed or variable cost to provide support for the session. The server 110 (see FIG. 1) would desire a profit that exceeds its costs. Such a cost may include a fixed cost for setting up the session, and a variable cost as a function of x (typically linear in x) to tunnel the bandwidth x for the session. The revenue $R_{Server}$ should exceed these fixed/variable costs for the server 110 (see FIG. 1).

The WWAN operator also has fixed and variable costs that need to be addressed to obtain a revenue $R_{Network}$ that exceeds its costs. In general, the WWAN operator may charge a few cents ($\alpha_N$) per MB or a fixed charge for a session while making a profit that covers its fixed and variable costs. If a 30 minute session typically consumes 25 MB, then at an example cost of 2 cents per MB, this implies a cost of 50 cents for a 30 minute session to the operator.

Figure 3:
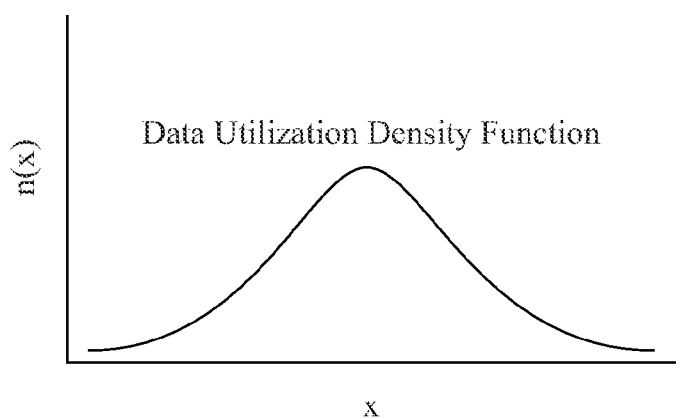
FIG. 3 is a graphical representation illustrating an example of a data utility density function per mobile client.

FIG. 3 is a graphical representation illustrating an example of a data utility density function per mobile client. With reference to FIG. 3, an example will be presented to illustrate a method for determining how much a WWAN operator would need to receive as revenue to cover its costs to provide support for incremental wireless data services around an existing mean data usage by users in the WWAN. In thus example, $n_{total}(x)$ is the density function of mobile client users for a data utilization of the amount of x GB per month. This function relates to mobile clients who have services provided by a given WWAN operator. Then the total number of mobile client users K in the WWAN is given by:

$$K = \int_0^\infty n_{total}(x) dx$$

x represent a random variable representing the amount of data utilization in the network per mobile client. $n_X(x) = (1/K) n_{total}(x)$ can be defined as the density function for a data utilization of x GB per month per mobile client. $n_X(x)$ is assumed normal $N(\mu;\sigma)$ where $\mu$ is the mean and $\sigma^2$ is the variance. The total data consumption by all K mobile clients 108 per month is given by $\int x \, n_{total}(x) \, dx = K \int x \, n(x) \, dx = K \mu$. Assuming, for example, that for current utilization of data in the network per mobile client for $n_X(x)$ is $N(\mu;\sigma)$, where $\mu=0.3$ GB, $\sigma=0.1$ GB. Such an assumption for $n_X(x)$ implies that on an average, a user uses 300 MB of data per month with a standard deviation of about 100 MB.

Figure 4:
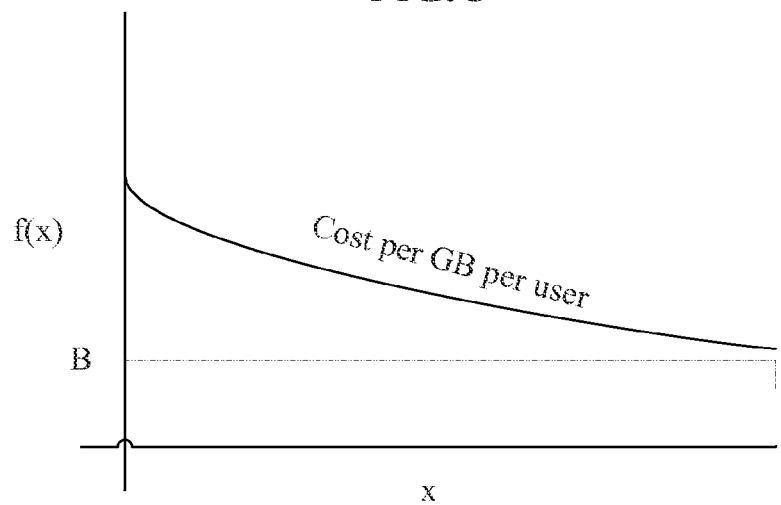
FIG. 4 is a graphical representation illustrating an example of amortized cost per mobile client.

FIG. 4 is a graphical representation illustrating an example of amortized cost per mobile client. With reference to FIG. 4, an exponentially decreasing function $f_{NO}(x)$ for the WWAN operator's cost per GB (for all data utilization for all mobile client users) is given by $f_{NO}(x) = \lambda A_0 e^{-\lambda x} + B_0$, where $\lambda$ is an exponential decay factor. This equation represents an amortization in the overall cost per GB as the data utilization in the network increases. A WWAN operator incurs fixed costs for the infrastructure that are independent of the data transmitted on the network, and operating costs that are a function of the data transmitted on the network. Therefore, as more data is transmitted in the WWAN primarily due to the fixed costs getting amortized with the increased usage in the WWAN. That increased usage results in increased revenue—eventually as usage increases, operating costs continue to get incurred such that the profit is maximized at a certain level of usage, and then drops for further usage. In this example, the WWAN operator cost per GB per user due to the fixed and operating expenses can be approximated by $f(x) = f_{NO}(x)/K$. If $A = A_0/K$ and $B = B_0/K$, then:

$$f(x) = \lambda A e^{-\lambda x} + B.$$

Figure 5:
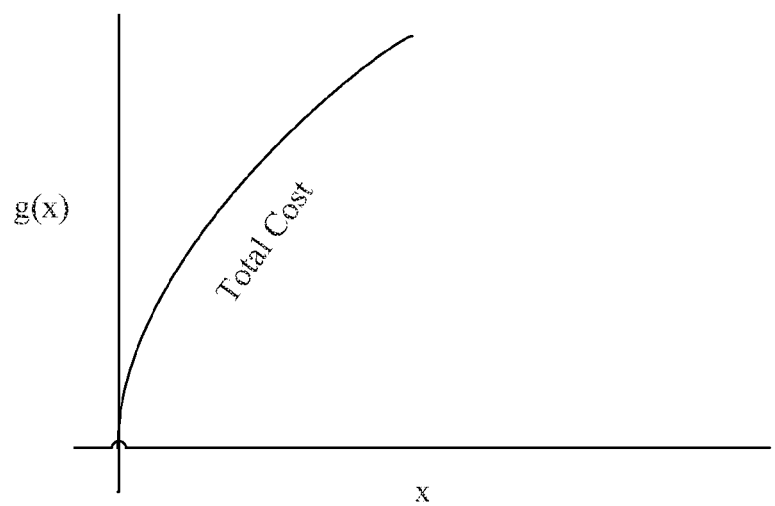
FIG. 5 is a graphical representation illustrating an example of total cost per mobile client.

FIG. 5 is a graphical representation illustrating an example of total cost per mobile client. Referring to FIG. 5, g(x), the cost for data utilization of x GBs by a given mobile client is given by:

$$g(x) = \int_0^x f(u) \, du \approx A(1 - e^{-\lambda x}) + Bx$$

For example, if A=\$30, B=\$14/GB, $\lambda=2$, then at x=0.5 GB, g(x)=\$25.96 and at x=5 GB, g(x)=\$100. The six-tuple ($\mu$, $\sigma$, $\lambda$, A, B, K) is defined as the network-state. Let TC be the total cost over all mobile clients based on their data utilization. Then:

$$TC = K \int_0^\infty g(x) n_X(x) dx = AK + BK\mu - AK e^{-\mu\lambda} e^{\lambda^2 \sigma^2/2} \quad (1)$$

Assuming a subscription cost $C_{sub}$ per month for the data plan, then the total revenue:

$$TR = KC_{sub} \quad (2)$$

Here, $C_{sub}$ could be $50 for example. Then the total profit, TP=TR−TC, is given by:

$$TC = TR - K \int_0^\infty g(x) n_x(x) dx \quad (3)$$

$$= KC_{sub} - K\left(A + B\mu - A e^{-\mu\lambda} e^{\lambda^2 \sigma^2/2}\right)$$

An aggregated incremental wireless data service is defined as a data service where subscribed mobile clients start consuming additional wireless data for the service delivery. To illustrate an example of an aggregated incremental wireless data service, a mobile node subscriber with WWAN connectivity exposes itself as an ad-hoc service provider to other mobile nodes, thereby becoming an ad-hoc service provider 106. Another mobile node, without WWAN connectivity, may connect to the ad-hoc service provider over the WLAN, and thereby becomes a mobile client. The ad-hoc service provider may provide a short term internet access session to such a mobile client. It may be useful to determine the pricing of the service to the mobile client to cover the costs involved such as a payment to the ad-hoc service provider and a payment to the WWAN operator. It is possible that the short range wireless access connection between the mobile client and the ad-hoc service provider is based on a wireless protocol other than that used by the WLAN. Based on the current costs of wireless data services, the WWAN operator could use the methodology described in this disclosure to determine its costs for supporting such an incremental wireless internet access service. Assuming that the WWAN is in an established mean state of utilization where $\mu = \mu_0$, and $\sigma = \sigma_0$, then the current mean state of utilization is given by the 6-tuple $(\mu_0, \sigma_0, \lambda, A, B, K)$. Then the total cost and total revenue are based on equations (1) and (2) respectively, where $\mu = \mu_0$, and $\sigma = \sigma_0$. Assuming that the proposed incremental wireless data service is deployed such that mobile clients start using incremental additional wireless data, resulting in additional data being carried by the WWAN, then the mean utilization in the WWAN shifts to a new normal distribution. Without loss of generality, let the new normal distribution be $N(\mu; \sigma)$. Then the new state of WWAN utilization is given by the quintuple $(\mu, \sigma, \lambda, A, B, K)$. Assuming that the new service results in additional revenue of $\alpha$ dollars per GB (where GB stands for Gigabyte), then the total revenue TR becomes:

$TR = KC_{sub} + K\alpha(\mu - \mu_0)$.

Therefore, the Marginal Revenue MR is given by:

$MR = \partial TR/\partial \mu = \alpha K$.

The Marginal Cost MC is given by:

$MC = \partial TC/\partial \mu = BK + AK\lambda e^{-\mu\lambda} e^{\lambda^2 \sigma^2/2}$.

The profit in the network is maximized when MR=MC which implies that:

$\alpha = B + A\lambda e^{-\mu\lambda} e^{\lambda^2 \sigma^2}$.

The incremental revenue, IR, from the aggregated incremental wireless data service is given by:

$IR = K\alpha(\mu - \mu_0)$.

The total cost for the new network state $(\mu, \sigma, \lambda, A, B, K)$ is given by equation (1). The increase in cost, IC, for the change of network state from $(\mu_0, \sigma_0, \lambda, A, B, K)$ to $(\mu, \sigma, \lambda, A, B, K)$ is given by:

$IC \approx BK(\mu - \mu_0) - AK(e^{-\mu\lambda} e^{\lambda^2 \sigma^2/2} - e^{-\mu_0 \lambda} e^{\lambda^2 \sigma_0^2/2})$ The total profit is given by equation (3). The incremental profit, IP, for this aggregated incremental wireless data service is given by:

$IP = IR - IC$ $= K\alpha(\mu - \mu_0) - BK(\mu - \mu_0) + AK\left(e^{-\mu\lambda} e^{\mu_0 \sigma^2/2} - e^{-\mu_0 \lambda} e^{\lambda^2 \sigma_0^2/2}\right)$ Therefore, if:

$$\alpha > B - \frac{A}{\Delta\mu}\left(e^{-\mu\lambda} e^{\lambda^2 \sigma^2/2} - e^{-\mu_0 \lambda} e^{\lambda^2 \sigma_0^2/2}\right),$$

then the aggregated incremental wireless data service is worthwhile considering. If $\sigma^2 \approx \sigma_0^2$, then:

$$A > B - \frac{A}{\Delta\mu} e^{\lambda^2 \sigma^2/2}(e^{-\mu\lambda} - e^{-\mu_0 \lambda}) \quad (4)$$

An example will now be presented where a typical mobile client consumes approximately 25 MB in an incremental wireless data session, and on an average there are three such sessions per mobile client in a given month. Then, one can expect the mean to shift from $\mu_0 = 0.3$ GB to $\mu = 0.375$ GB. Therefore, assuming, for example, that the WWAN shifts from the state $(\mu_0, \sigma_0, \lambda, A, B, K)$ to the state $(\mu, \sigma, \lambda, A, B, K)$ where A=30, B=14, $\lambda$=2, $\mu_0$=0.3 GB, $\sigma_0$=0.1, $\mu$=0.375 GB, $\sigma$=0.1, then from equation (4), we find that, if $\alpha \geq 14 - 400*(0.4839 - 0.5598)$, or equivalently, if $\alpha \geq 44$ dollars/GB or approximately 4.4 cents/MB, then the aggregated incremental wireless data service is worth considering. If a typical mobile client uses up 25 MB in an incremental wireless data session, then this suggests that the wireless network operator needs to get paid at least $1.10 for the session.

The numbers used in the analysis for cost of data transmission in an operator's WWAN are only an illustration of the values for the network cost model used. For specific costs associated with different WWAN operators, the values associated with the models will vary. Different WWAN operators may have different pricing models as a function of the amount of data consumed by the mobile client, so that the revenue associated with the mobile client subscribers can change based on the pricing associated with the data consumed. However, the analysis is still applicable under such pricing. In addition, multiple entities may be involved in providing a service. The costs for administering such a service can be higher than the cost of merely admitting a paid mobile client subscriber into the WWAN and authenticating that subscriber. An incremental data session needs to be created with security considerations with dynamic authentication of the mobile client and dynamic enabling of the mobile client to the service. However, since mobile clients are expected to pay higher for the service based on the perceived value of the service at a given location and time, the incremental data services become viable despite the additional costs involved. An ad-hoc service provider would have to ensure that its pricing covers the costs of other entities that are involved in providing the services, such as the WWAN operator or a authentication/tunneling server entity in the WWAN. In some cases, the authentication/tunneling server is supported by the WWAN operator, then the WWAN operator needs to determine its overall costs of transporting the data in its network, and providing the authentication/tunneling services.

It should be noted that the estimates based on the change in the mean state of network utilization for a WWAN operator provides a mean price a for the WWAN operator to provide an incremental wireless data service. The system load in the WWAN associated with the WWAN operator can vary as a function of the time of the day. For example, the system load in the WWAN can be very high at peak hours such as a rush hour around 8:00 a.m. or 5 p.m. At other times the system load may be lower. Based on the system load, the mean price a may be qualified by a change in the pricing based on the system load. At higher system loads, the pricing $\alpha_{new}$ can be higher than the mean price a for the service, and at lower system loads, the pricing $\alpha_{new}$ may be lower than the mean price $\alpha$ for the service. For example the cost may be modified as follows:

$$\alpha_{new} = \max(\alpha_{min}, \alpha K(1))$$

where $\alpha_{new}$ is the modified price based on the system load, $\alpha$ is the mean price associated with the WWAN operator, $\alpha_{min}$ is the lowest price that may be agreeable to the operator, and K(1) is a sigmoid function of the system load 1. Such a determination can be made at the ad-hoc service provider based on availability of the current system load 1, and the price factors $\alpha$ and $\alpha_{min}$ that the WWAN operator can provide to the ad-hoc service provider. Typical the factors $\alpha$ and $\alpha_{min}$ can be stored statically in memory well ahead of the time of service, whereas the load 1 can be dynamically provided by the WWAN operator to the ad-hoc service provider at the time of the service. The form of the function used on the system load such as a sigmoid can also be stored statically in memory at the ad-hoc service provider for future use. It should be noted that the sigmoid function is provided as an example function, and other linear or nonlinear functions of the system load can also be used to determine a modified pricing associated with the WWAN operator. Based on the pricing associated with the WWAN operator and optional external server costs, the ad-hoc service provider can then determine its pricing based on its desired revenue and the costs that are needed to compensate the operator or the server. In simpler variants, the WWAN operator may dynamically provide merely its price to the ad-hoc service provider, so that the operator cost can be used to determine a pricing by the ad-hoc service provider.

In at least one configuration of an ad-hoc service provider, a processing system may be used to implement the WWAN and WLAN network interfaces 202, 204, the filtered interconnection and session monitoring module 206, the service provider application 208, and the user interface 212 (see FIG. 2). Although shown as part of the processing system, those skilled in the art will recognize that any of these components may be implemented, either in whole or part, in another entity separate from the processing system.

Figure 6:
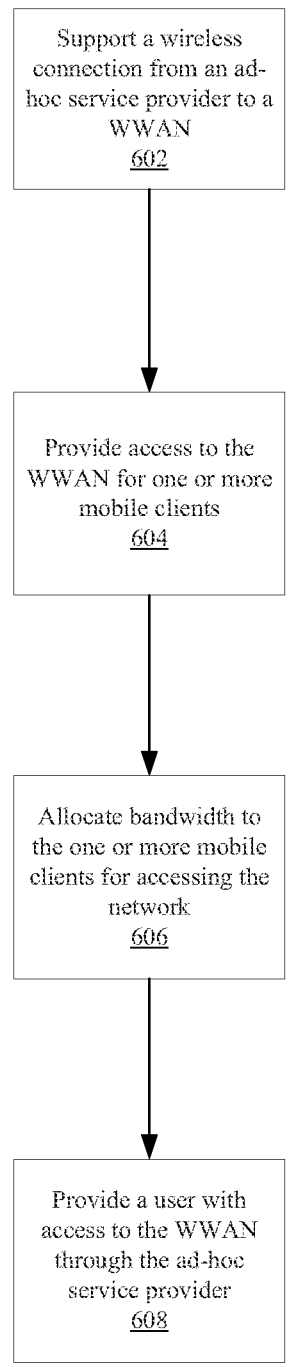
FIG. 6 is a flow diagram illustrating an example of an algorithm implemented by the service provider application in the ad-hoc service provider.

FIG. 6 is a flow diagram illustrating an example of an algorithm implemented by the service provider application 208 (see FIG. 2) in the ad-hoc service provider. It will be understood, however, that the other algorithms may be used by ad-hoc service providers to perform the same or similar functions. In this example, a WWAN interface 202 (see FIG. 2) supports a wireless connection from an ad-hoc service provider to a WWAN in step 602. The algorithm implemented by the service provider application provides access to the WWAN for one or more mobile clients in step 604, and allocates bandwidth to the one or more mobile clients for accessing the WWAN based on at least one parameter related to the effect on the ad-hoc service provider for providing such access in step 606. A user interface 212 (see FIG. 2) provides a user with access to the WWAN through the ad-hoc service provider in step 608.

The algorithm to allocate bandwidth to one or more mobile clients in step 606 may be implemented in various ways. By way of example, the bandwidth allocated to the one or more mobile clients is determined by maximizing a utility function that is a function of one or more parameters, the utility function being maximized when the derivative of the utility function is zero. The one or more parameters may include revenue R(x) generated by the ad-hoc service provider for the bandwidth allocated to the one or more mobile clients, energy E(x) required by the ad-hoc service provider to provide the allocated bandwidth to the one or more mobile clients, loss of bandwidth B(x) that would otherwise be available to the user to access the network, processing resources P(x) required by the ad-hoc service provider to provide the allocated bandwidth to the one or more mobile clients, and a quality of service metric G(x), where x is the bandwidth allocated to the one or more mobile clients.

Figure 7:
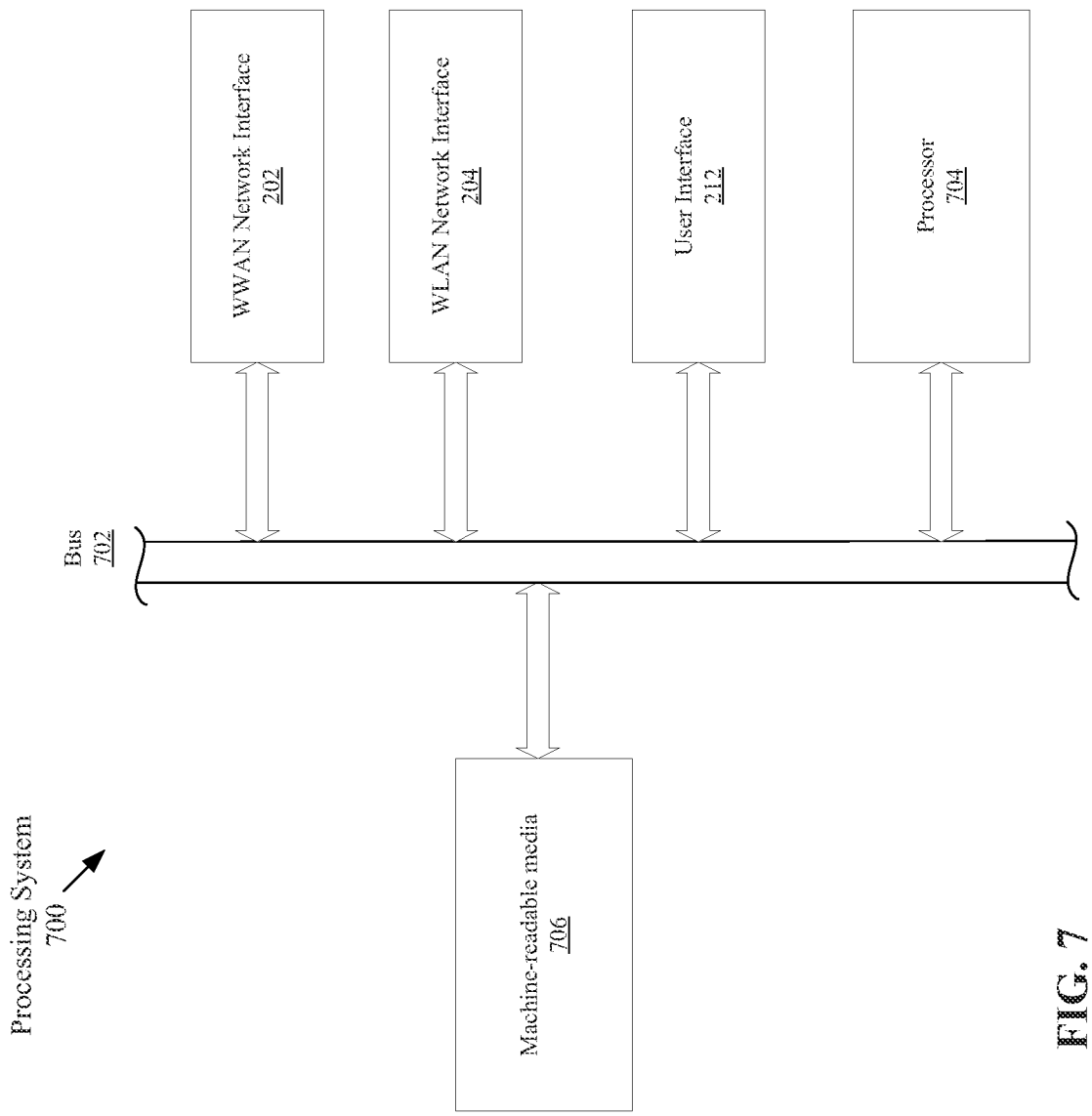
FIG. 7 is a simplified diagram illustrating an example of a hardware configuration for a processing system in an ad-hoc service provider.

FIG. 7 is a simplified diagram illustrating an example of a hardware configuration for a processing system in an ad-hoc service provider. In this example, the processing system 700 may be implemented with a bus architecture represented generally by a bus 702. The bus 702 may include any number of interconnecting buses and bridges depending on the specific application of the processing system 700 and the overall design constraints. The bus links together various circuits including a processor 704, machine-readable media 706, the WWAN and WLAN network interfaces 202, 204, and the user interface 212. The bus 702 may also link various other circuits such as timing sources, peripherals, voltage regulators, power management circuits, and the like, which are well known in the art, and therefore, will not be described any further.

The processor 704 is responsible for managing the bus and general processing, including the execution of software stored on the machine-readable media 706. The software includes instructions that when executed by the processor 704 cause the processing system 700 to perform the various functions described earlier in connection with the filtered interconnection and session monitoring module 206 and service provider application 208 (see FIG. 2), as well as perform various protocol functions running on top of the WWAN and WLAN network interfaces 202, 204.

Figure 8:
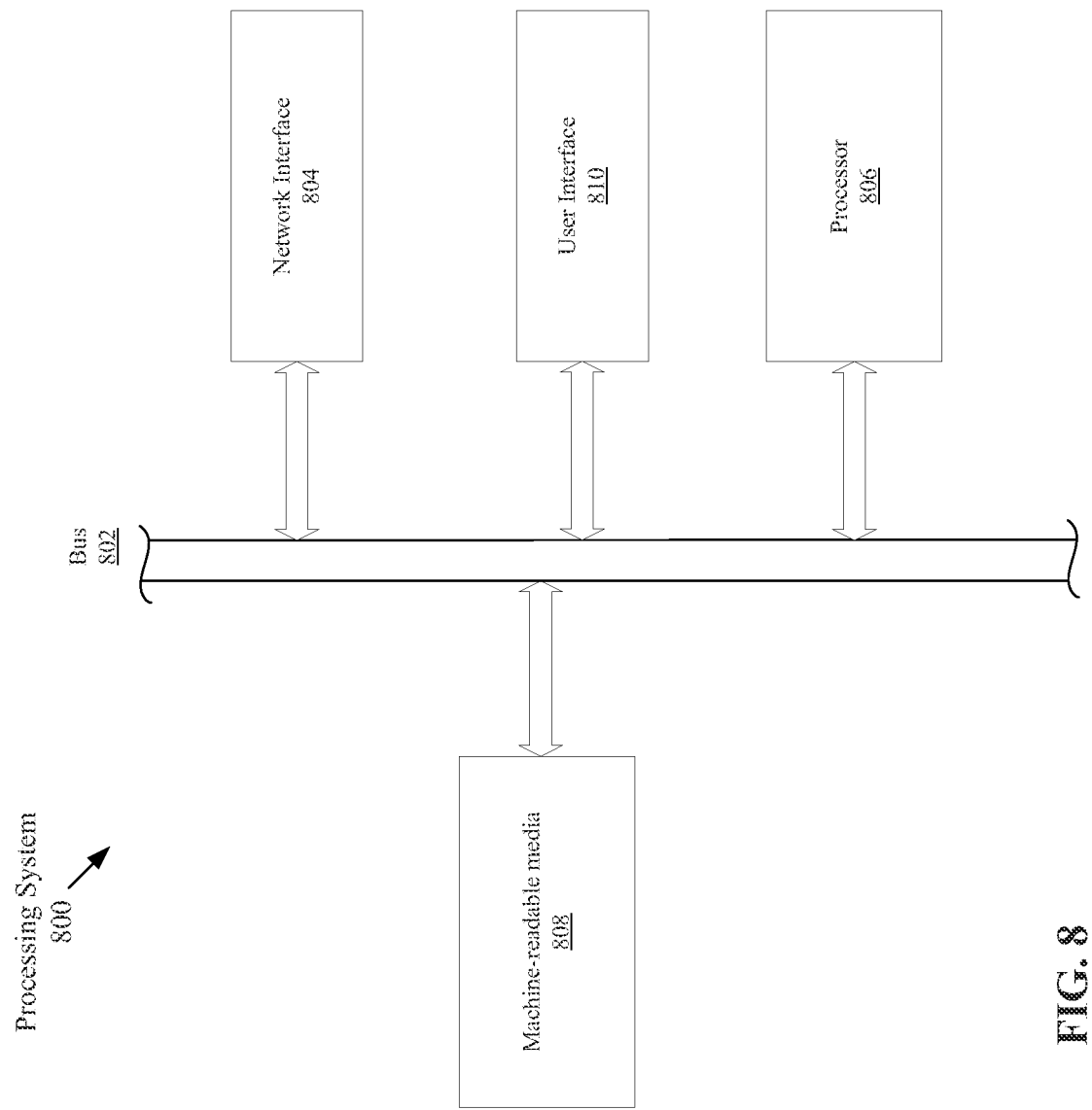
FIG. 8 is a simplified diagram illustrating an example of a hardware configuration for a mobile client.

FIG. 8 is a simplified diagram illustrating an example of a hardware configuration for a mobile client. In this example, the mobile client is implemented with a processing system 800 having a bus architecture represented generally by 802. The bus 802 may include any number of interconnecting buses and bridges depending on the specific application of the processing system 800 and the overall design constraints. The bus links together various circuits including a network interface 804, a processor 806, machine-readable media 808, and a user interface 810 (e.g., a keypad, display, speaker, microphone, joystick, and/or any other combination user interface devices). Although shown as part of the processing system 800, those skilled in the art will recognize that any of these components may be implemented, either in whole or part, in another entity separate from the processing system 800. The bus 802 may also link various other circuits such as timing sources, peripherals, voltage regulators, power management circuits, and the like, which are well known in the art, and therefore, will not be described any further.

Similar to the WWAN and WLAN network interfaces 202, 204 (see FIGS. 2 and 6) discussed earlier in connection with the ad-hoc service provider 106, the network interface 804 may be configured to implement the physical layer by providing the means to transmit data in accordance with the physical and electrical specifications required to interface to the transmission medium. The network interface 804 may also be configured to implement the lower portion of the data link layer by managing access to the transmission medium.

The processor 806 is responsible for managing the bus and general processing, including the execution of software stored on the machine-readable media 808. The software includes instructions that when executed by the processor 806 cause the processing system 800 to perform the various functions, which include means for using an ad-hoc service provider to support a wireless connection to a network. The processing system 800 may also be used to support registration and authentication of the mobile client with the server, searching for and selecting ad-hoc service providers, control session management, handoffs between multiple ad-hoc service providers, data tunneling, and various protocol functions running on top of the network interface 804.

As discussed above, the processing system 800 provides a means for selecting the ad-hoc service provider based on at least one parameter related to the ad-hoc service provider's ability to support the wireless connection. The process of selecting between available ad-hoc service providers may be based on any number of parameters such as, by way of example, the cost of the service, the duration of available service, the quality metric of the ad-hoc service provider, the average WWAN backhaul bandwidth available from the ad-hoc service provider, and/or the wireless link quality between the mobile client and the ad-hoc service provider.

Figure 9:
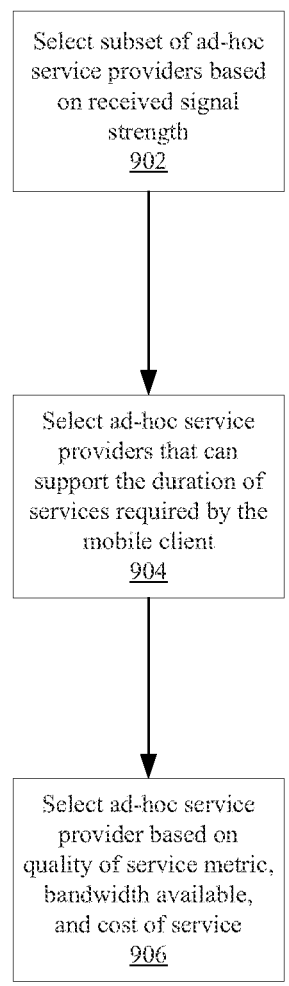
FIG. 9 is a flow diagram illustrating an example of an algorithm implemented by the processing system in a mobile client to select an ad-hoc service provider.

FIG. 9 is a flow diagram illustrating an example of an algorithm implemented by the processing system to select an ad-hoc service provider. It will be understood, however, that the other algorithms may be used by mobile clients. In this example, a subset of ad-hoc service providers that can provide good wireless link quality is selected in step 902. The subset may be selected based on the strength of the received signal, which is commonly referred to as received signal strength indicator (RSSI), or by some other suitable means. The ad-hoc service providers that can support the duration of service are then selected from this subset in step 904. Next, in step 906, the quality of service metric G, the bandwidth available B, and the cost of service C may then be used to select the ad-hoc service provider to connect with. The selection may be based on a metric such as $(G)(B)/P$. Alternatively, the appropriate ad-hoc service provider may be selected using the metric B/P among those ad-hoc service providers whose quality of service metric G exceeds a certain threshold. Those skilled in the art will be readily able to determine the best suited algorithm for selecting an ad-hoc service provider based on the particular application and the design constraints imposed on the mobile client and/or the overall telecommunications system. Once an ad-hoc service provider is selected, the mobile client uses the selected provider to support a wireless connection to the WWAN.

In one configuration of telecommunications systems, a mobile client may cooperate with another mobile client to increased the bandwidth/time available to each. An example will now be presented with reference to FIG. 1 where two mobile clients $108_1$ and $108_2$ both have the ability to directly connect to the a WWAN 104. In this example, it is possible that the first mobile client $108_1$ has a better link to the WWAN 104 relative to the second mobile node $108_2$ link to the WWAN 104. In this case, the first mobile client $108_1$ could become an ad-hoc service provider 106 for the second mobile client $108_2$.

This configuration may provide a benefit to each of the mobile clients 108. An example will now be presented with the first mobile client $108_1$ having a 800 kbps link with the WWAN 104 and the second mobile client $108_2$ having a 200 kbps link with the WWAN 104. If the WWAN 104 allocates 1 second of time to each of the mobile clients 108, then the links carry 700 kbits total data in 2 seconds. If, on the other hand, the second mobile client $108_2$ uses the first mobile client $108_1$ as an ad-hoc service provider 106, then the link between the first mobile client $108_1$ and the WWAN 104 can carry 700 kbits in 1.4 seconds. Therefore, essentially 0.6 seconds of time becomes available in the telecommunications system. The additional 0.6 seconds can be shared by all three entities (e.g., the first mobile client $108_1$ could send additional 100 kbits in 0.2 seconds, the second mobile client $108_2$ a could also send another 100 kbits using the first mobile client $108_1$ in 0.2 seconds, and the remaining 0.2 seconds could be given back to the WWAN 104 to be allocated to other mobile clients 108).

Figure 10:
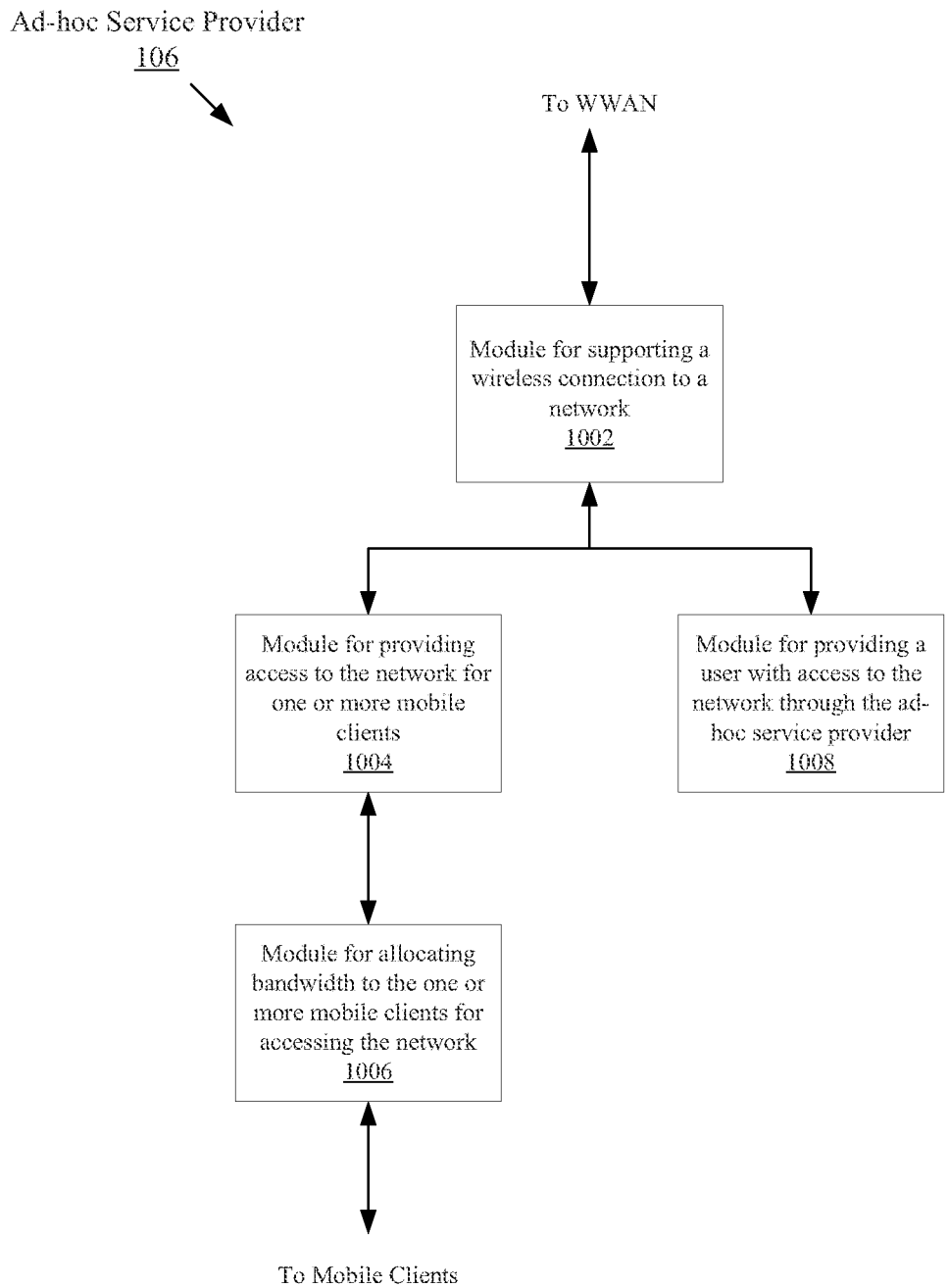
FIG. 10 is a simplified diagram illustrating an example of the functionality of an ad-hoc service provider.

FIG. 10 is a simplified diagram illustrating an example of the functionality of an ad-hoc service provider. The ad-hoc service provider 106 includes a module 1002, which provides the means for supporting a wireless connection to a network; a module 1004, which provides the means for providing access to the network for one or more mobile clients; a module 1006, which provides the means for allocating bandwidth to the one or more mobile clients for accessing the network based on at least one parameter related to the effect on the ad-hoc service provider for providing such access; and a module 1008, which provides the means for providing a user with access to the network through the ad-hoc service provider. The modules may be implemented by the various functional blocks and hardware/software components, as described above, or by any other means now known or later developed.

FIG. 11 is a simplified diagram illustrating an example of the functionality of a mobile client. The mobile client 108 includes a module 1012, which provides the means for using an ad-hoc service provider to support a wireless connection to a network; and a module 1014, which provides the means for selecting the ad-hoc service provider based on at least one parameter related to the ad-hoc service provider's ability to support the wireless connection. The modules may be implemented by the various functional blocks and hardware/software components, as described above, or by any other means now known or later developed.

Those of skill in the art would appreciate that the various illustrative blocks, modules, elements, components, methods, and algorithms described herein may be implemented as electronic hardware, computer software, or combinations of both. To illustrate this interchangeability of hardware and software, various illustrative blocks, modules, elements, components, methods, and algorithms have been described above generally in terms of their functionality. Whether such functionality is implemented as hardware or software depends upon the particular application and design constraints imposed on the overall system. Skilled artisans may implement the described functionality in varying ways for each particular application.

In various configurations of a telecommunications described thus far, a processor has been disclosed as one means for implementing a processing system in the ad-hoc service provider 106 and mobile client 108. The processor may be implemented with one or more general-purpose and/or special-purpose processors. Examples include microprocessors, microcontrollers, DSP processors, and other circuitry that can execute software. Software shall be construed broadly to mean instructions, data, or any combination thereof, whether referred to as software, firmware, middleware, microcode, hardware description language, or otherwise. Machine-readable media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof In the processing systems presented in this disclosure, the machine-readable media is shown as part of the processing system separate from the processor. However, as those skilled in the art will readily appreciate, the machine-readable media, or any portion thereof, may be external to the processing system. By way of example, the machine-readable media may include a transmission line, a carrier wave modulated by data, and/or a computer product separate from the server, all which may be accessed by the processor through the network interface. Alternatively, or in addition to, the machine readable media, or any portion thereof, may be integrated into the processor, such as the case may be with cache and/or general register files.

The software supported by the machine-readable media may reside in a single storage device or distributed across multiple memory devices. By way of example, software may be loaded into RAM from a hard drive when a triggering event occurs (e.g., a mobile node decides to become an ad-hoc service provider 106). During execution of the software, the processor may load some of the instructions into cache to increase access speed. One or more cache lines may then be loaded into a general register file for execution by the processor. When referring to the functionality of software, it will be understood that such functionality is implemented by the processor when executing instructions from such software.

The processing system may be configured as a general-purpose processing system with one or more microprocessors providing the processor functionality and external memory providing at least a portion of the machine-readable media, all linked together with other supporting circuitry through an external bus architecture. Alternatively, the processing system may be implemented with an ASIC (Application Specific Integrated Circuit) with the processor, the network interface, supporting circuitry (not shown), and at least a portion of the machine-readable media integrated into a single chip, or with one or more FPGAs (Field Programmable Gate Array), PLDs (Programmable Logic Device), controllers, state machines, gated logic, discrete hardware components, or any other suitable circuitry, or any combination of circuits that can perform the various functionality described throughout this disclosure. Those skilled in the art will recognize how best to implement the described functionality for the processing system depending on the particular application and the overall design constraints imposed on the overall system.

It is understood that the specific order or hierarchy of steps in the processes disclosed is an illustration of exemplary approaches. Based upon design preferences, it is understood that the specific order or hierarchy of steps in the processes may be rearranged. The accompanying method claims present elements of the various steps in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for."

What is claimed is:

1. A mobile ad-hoc service provider, comprising:
a mobile node comprising a processing system configured to support a wireless connection to a network, the processing system being further configured to provide access to the network for one or more mobile clients that are not subscribers to the network and to allocate bandwidth on the wireless connection to the network to the one or more mobile clients for accessing the network based on at least one parameter determined at the mobile ad-hoc service provider and related to the effect on the mobile ad-hoc service provider for providing such access, wherein the processing system comprises a user interface configured to provide a user of a corresponding mobile client of the one or more mobile clients with access to the network through the processing system, and wherein the at least one parameter comprises a parameter associated with an amount of energy required by the ad-hoc service provider to provide the allocated bandwidth to the one or more mobile clients compared to an amount of available energy of an onboard power source of the mobile ad-hoc service provider.

2. The ad-hoc service provider of claim 1 wherein said at least one parameter comprises revenue generated by the ad-hoc service provider for the bandwidth allocated to the one or more mobile clients.

3. The ad-hoc service provider of claim 1 wherein said at least one parameter comprises loss of bandwidth that would otherwise be available to the user to access the network.

4. The ad-hoc service provider of claim 1 wherein said at least one parameter comprises processing resources required by the processing system to provide the allocated bandwidth to the one or more mobile clients.

5. The ad-hoc service provider of claim 1 wherein said at least one parameter comprises a quality of service or goodness metric.

6. The ad-hoc service provider of claim 1 wherein processing system is further configured to determine the bandwidth allocated to the one or more mobile clients by maximizing a utility function that is a function of said at least one parameter, the utility function being maximized when the derivative of the utility function is zero.

7. The ad-hoc service provider of claim 6 wherein said at least one parameter comprises revenue generated by the ad-hoc service provider for the bandwidth allocated to the one or more mobile clients, loss of bandwidth that would otherwise be available to the user to access the network, processing resources required by the processing system to provide the allocated bandwidth to the one or more mobile clients, and a quality of service or goodness metric.

8. The ad-hoc service provider of claim 7 wherein the processing system is further configured to determine the revenue for a session by maximizing the utility function.

9. The ad-hoc service provider of claim 7 wherein the processing system is further configured to maximize the utility function by weighting the energy required by the ad-hoc service provider by a weighting factor that is a function of energy available to the ad-hoc service provider.

10. The ad-hoc service provider of claim 9 wherein the energy factor is an increasing step function, linear function, or sigmoidal function of a current energy state of the ad-hoc service provider.

11. The ad-hoc service provider of claim 8 wherein one or more of said at least one parameters comprises a linear function.

12. The ad-hoc service provider of claim 8 wherein one or more of said at least one parameters comprises a sigmoidal function.

13. The ad-hoc service provider of claim 6 wherein the processing system is further configured to compute an availability function for the ad-hoc service provider, and to terminate service to said at least one of the one or more mobile clients as a function of the utility function and the availability function.

14. The ad-hoc service provider of claim 13 wherein the processing system is further configured to terminate the service to said at least one of the one or more mobile clients by handing off said at least one of the one or more mobile clients to another ad-hoc service provider.

15. The ad-hoc service provider of claim 13 wherein the availability function comprises a step function between an available state and an unavailable state.

16. The ad-hoc service provider of claim 13 wherein the availability function comprises a decreasing function from an available state to an unavailable state.

17. The ad-hoc service provider of claim 13 wherein the processing system is further configured to terminate the service to said at least one of the one or more mobile clients if the product of the utility function and the availability function falls below a threshold.

18. The ad-hoc service provider of claim 13 wherein the processing system is further configured to determine said at least one of the one or more mobile clients to terminate the service to based on priorities assigned to the one or more mobile clients.

19. The ad-hoc service provider of claim 1 wherein the processing system is further configured to determine a price for each of the one or more mobile clients to use the ad-hoc service provider to access the network.

20. The ad-hoc service provider of claim 19 wherein the processing system is further configured to determine the price for each of the one or more mobile clients based on the bandwidth available to allocate to each.

21. The ad-hoc service provider of claim 19 wherein the processing system is further configured to determine the price for each of the one or more mobile clients based on a price offered by each of at least one other ad-hoc service provider.

22. The ad-hoc service provider of claim 1 wherein said at least one parameter comprises one or more local parameters.

23. The ad-hoc service provider of claim 22 wherein said at least one parameter comprises one or more observable parameters from other ad-hoc service providers.

24. The ad-hoc service provider of claim 23 wherein the one or more observable parameters represent an average of local parameters associated with the other ad-hoc service providers.

25. The ad-hoc service provider of claim 23 wherein the one or more observable parameters comprises at least one of pricing, a quality of service or goodness metric, available bandwidth, and duration of service available for each of the other ad-hoc service providers.

26. The ad-hoc service provider of claim 22 wherein said one or more local parameters comprises revenue generated by the ad-hoc service provider for the bandwidth allocated to the one or more mobile clients, loss of bandwidth that would otherwise be available to the user to access the network, processing resources required by the processing system to provide the allocated bandwidth to the one or more mobile clients, a quality of service or goodness metric, network cost to support the allocated bandwidth to the one or more mobile clients, and server cost to support the allocated bandwidth to the one or more mobile clients.

27. The ad-hoc service provider of claim 26 wherein said one or more local parameters comprises network cost to support the allocated bandwidth to the one or more mobile clients.

28. The ad-hoc service provider of claim 27 wherein the network cost is related to a cost to a network operator that is dependent on the change in a mean state of utilization of the network for the network operator for an incremental wireless data service.

29. The ad-hoc service provider of claim 28 wherein the network cost is further related to a cost to the network operator that is dependent on a current system load in the network associated with the network operator.

30. The ad-hoc service provider of claim 29 wherein the processing system determines the network cost to compensate the network operator based on dynamic information about the system load from the network operator, static or dynamic information associated with a mean pricing for the network operator, and a minimum pricing for the network operator.

31. The method of claim 1, wherein the processing system is further configured to determine a price for each of the one or more mobile clients to use the ad-hoc service provider to access the network by contacting a server associated with the ad-hoc service provider to obtain pricing information.

32. A mobile client, comprising:
a processing system configured to use a mobile ad-hoc service provider to support a wireless connection to a network to which the mobile client is not a subscriber, the processing system being further configured to select the ad-hoc service provider based on at least one service parameter related to the wireless connection and provided by the mobile ad-hoc service, wherein the at least one parameter comprises at least one parameter comprising an amount of energy required by the mobile ad-hoc service provider to provide the allocated bandwidth to the mobile client compared to an amount of available energy of an onboard power source of the mobile ad-hoc service provider.

33. The mobile client of claim 32 wherein said at least one parameter comprises duration of the wireless connection to the network that the ad-hoc service provider is able to provide to the mobile client.

34. The mobile client of claim 32 wherein said at least one parameter comprises bandwidth that the ad-hoc service provider is able to provide to the mobile client for the wireless connection to the network.

35. The mobile client of claim 32 wherein said at least one parameter comprises cost for using the ad-hoc service provider to provide the wireless connection to the network.

36. The mobile client of claim 32 wherein said at least one parameter comprises a quality of service metric for the ad-hoc service provider.

37. The mobile client of claim 32 wherein the processing system is further configured to select the ad-hoc service provider based on the quality of the wireless link to the ad-hoc service provider.

38. The mobile client of claim 32 wherein the processing system is further configured to select a plurality of ad-hoc service providers based on signal strength received from each, the processing system being further configured to select the ad-hoc service provider from the plurality of ad-hoc service providers.

39. The mobile client of claim 38 wherein the processing system is further configured to select, from the plurality of service providers, one or more ad-hoc service providers that are able to provide the mobile client with a wireless connection to the network for a desired duration, the processing system being further configured to select the ad-hoc service provider from the one or more ad-hoc service providers.

40. A mobile ad-hoc service provider implemented in a mobile node, the mobile ad-hoc service provider comprising:
   means for supporting a wireless connection to a network;
   means for providing access to the network for one or more mobile clients that are not subscribers to the network;
   means for allocating bandwidth on the wireless connection to the network to the one or more mobile clients for accessing the network based on at least one parameter determined at the mobile ad-hoc service provider and related to the effect on the mobile ad-hoc service provider for providing such access, the at least one parameter comprising a parameter associated with an amount of energy required by the mobile ad-hoc service provider to provide the allocated bandwidth to the one or more mobile clients compared to an amount of available energy of an onboard power source of the mobile ad-hoc service provider; and
   means for providing a user of a corresponding mobile client of the one or more mobile clients with access to the network through the mobile ad-hoc service provider.

41. The ad-hoc service provider of claim 40 wherein the means for allocating bandwidth comprises means for determining the bandwidth allocated to the one or more mobile clients by maximizing a utility function that is a function of said at least one parameter, the utility function being maximized when the derivative of the utility function is zero.

42. A mobile client, comprising:
   means for using a mobile ad-hoc service provider to support a wireless connection from a mobile client to a network to which the mobile client is not a subscriber; and
   means for selecting the mobile ad-hoc service provider based on at least one service parameter related to the wireless connection and provided by the ad-hoc service provider, wherein the at least one parameter comprises at least one parameter comprising an amount of energy required by the mobile ad-hoc service provider to provide the allocated bandwidth to the mobile client compared to an amount of available energy of an onboard power source of the mobile ad-hoc service provider.

43. The mobile client of claim 42 wherein said at least one parameter comprises at least one of (a) duration of the wireless connection to the network that the ad-hoc service provider is able to provide to the mobile client, (b) bandwidth that the ad-hoc service provider is able to provide to the mobile client for the wireless connection to the network, (c) cost for using the ad-hoc service provider to provide the wireless connection to the network, and (d) a quality of service metric for the ad-hoc service provider.

44. A method of communications using a mobile ad-hoc service provider implemented in a mobile node, comprising:
   supporting a wireless connection from the mobile ad-hoc service provider to a network;
   providing access to the network for one or more mobile clients that are not subscribers to the network;
   allocating bandwidth to the one or more mobile clients for accessing the network based on at least one parameter determined at the mobile ad-hoc service provider and related to the effect on the mobile ad-hoc service provider for providing such bandwidth, the at least one parameter comprising a parameter associated with an amount of energy required by the mobile ad-hoc service provider to provide the allocated bandwidth to the one or more mobile clients compared to an amount of available energy of an onboard power source of the mobile ad-hoc service provider; and
   providing a user of a corresponding mobile client of the one or more mobile clients with access to the network through the ad-hoc service provider.

45. The method of claim 44 wherein the allocation of bandwidth comprises determining the bandwidth allocated to the one or more mobile clients by maximizing a utility function that is a function of said at least one parameter, the utility function being maximized when the derivative of the utility function is zero.

46. A method of communications, comprising:
   using a mobile ad-hoc service provider to support a wireless connection from a mobile client to a network to which the mobile client is not a subscriber; and
   selecting the mobile ad-hoc service provider based on at least one parameter determined at the mobile ad-hoc service provider and related to support of the wireless connection, the at least one parameter comprising a parameter associated with an amount of energy required by the mobile ad-hoc service provider to provide the allocated bandwidth to the mobile client compared to an amount of available energy of an onboard power source of the mobile ad-hoc service provider.

47. The method of claim 46 wherein said at least one parameter comprises at least one of (a) duration of the wireless connection to the network that the ad-hoc service provider is able to provide to the mobile client, (b) bandwidth that the ad-hoc service provider is able to provide to the mobile client for the wireless connection to the network, (c) cost for using the ad-hoc service provider to provide the wireless connection to the network, and (d) a quality of service metric for the ad-hoc service provider.

48. A non-transitory machine-readable medium comprising instructions executable by a processing system in an ad hoc mobile service provider implemented in a mobile node, the instructions comprising code for:
   supporting a wireless connection from a mobile ad-hoc service provider to a network;
   providing access to the network for one or more mobile clients that are not subscribers to the network;
   allocating bandwidth on the wireless connection to the network to the one or more mobile clients for accessing the network based on at least one parameter determined at the mobile ad-hoc service provider and related to the effect on the mobile ad-hoc service provider for providing such bandwidth, the at least one parameter comprising a parameter associated with an amount of energy required by the mobile ad-hoc service provider to provide the allocated bandwidth to the one or more mobile clients compared to an amount of available energy of an onboard power source of the mobile ad-hoc service provider; and providing a user with access to the network through the ad-hoc service provider.

49. The non-transitory machine-readable medium of claim 48, wherein allocating bandwidth comprises determining the bandwidth allocated to the one or more mobile clients by maximizing a utility function that is a function of said at least one parameter, the utility function being maximized when the derivative of the utility function is zero.

50. A non-transitory machine-readable medium comprising instructions executable by a processing system in a mobile client, the instructions comprising code for:

using a mobile ad-hoc service provider to support a wireless connection from a mobile client to a network to which the mobile client is not a subscriber; and selecting the mobile ad-hoc service provider based on at least one parameter determined at the mobile ad-hoc service provider and related to support of the wireless connection, wherein the at least one parameter comprises at least one parameter comprising an amount of energy required by the mobile ad-hoc service provider to provide the allocated bandwidth to the mobile client compared to an amount of available energy of an onboard power source of the mobile ad-hoc service provider.

51. The non-transitory machine-readable medium of claim 50, wherein selecting the mobile ad-hoc service provider based on at least one parameter comprises selecting the mobile ad-hoc service provider based on at least one of (a) duration of the wireless connection to the network that the ad-hoc service provider is able to provide to the mobile client, (b) bandwidth that the ad-hoc service provider is able to provide to the mobile client for the wireless connection to the network, (c) cost for using the ad-hoc service provider to provide the wireless connection to the network, and (d) a quality of service metric for the ad-hoc service provider.

* * * * *